US012681572B2

(12) United States Patent
Chen et al.

(10) Patent No.: US 12,681,572 B2
(45) Date of Patent: Jul. 14, 2026

(54) METHOD AND WEARABLE DEVICE FOR DETECTING AND VERBALIZING NONVERBAL COMMUNICATION

(71) Applicants: The Regents of the University of California, Oakland, CA (US); Chongqing University, Chongqing (CN)

(72) Inventors: Jun Chen, Los Angeles, CA (US); Jin Yang, Chongqing (CN); Zhihao Zhou, Chongqing (CN)

(73) Assignees: The Regents of the University of California, Oakland, CA (US); Chongqing University, Chongqing (CN)

( * ) Notice: Subject to any disclaimer, the term of this patent is extended or adjusted under 35 U.S.C. 154(b) by 1015 days.

(21) Appl. No.: 17/796,597

(22) PCT Filed: Jan. 28, 2021

(86) PCT No.: PCT/US2021/015528
§ 371 (c)(1),
(2) Date: Jul. 29, 2022

(87) PCT Pub. No.: WO2021/155023
PCT Pub. Date: Aug. 5, 2021

(65) Prior Publication Data
US 2023/0052134 A1 Feb. 16, 2023

Related U.S. Application Data

(60) Provisional application No. 62/967,509, filed on Jan. 29, 2020.

(51) Int. Cl.
G06F 3/01 (2006.01)
G01D 5/20 (2006.01)
G09B 21/00 (2006.01)

(52) U.S. Cl.
CPC ............ G06F 3/014 (2013.01); G01D 5/202 (2013.01); G06F 3/017 (2013.01); G09B 21/009 (2013.01)

(58) Field of Classification Search
CPC ......... G06F 3/014; G06F 3/017; G01D 5/202; G09B 21/009; A61B 5/4803
See application file for complete search history.

(56) References Cited

U.S. PATENT DOCUMENTS

| | | | | |
|---|---|---|---|---|
| 1,170,811 A | * | 2/1916 | Driver | H01C 3/02 |
| | | | | 174/32 |
| 2,422,477 A | * | 6/1947 | Driver | H05B 3/56 |
| | | | | 338/214 |

(Continued)

FOREIGN PATENT DOCUMENTS

| | | | | | |
|---|---|---|---|---|---|
| CN | 107992201 A | * | 5/2018 | ............. | G06F 3/014 |
| CN | 113238661 A | * | 8/2021 | ............. | G06F 3/017 |

(Continued)

OTHER PUBLICATIONS

International Search Report and Written Opinion for PCT Application No. PCT/US2021/015528 dated Jun. 23, 2021.

(Continued)

*Primary Examiner* — Pedro J Cuevas
(74) *Attorney, Agent, or Firm* — Foley & Lardner LLP

(57) ABSTRACT

A triboelectric sensor device with a substantially cylindrical nonconductive core, and a conductive fiber substantially helically disposed around the conductive core and in an axial direction thereof. Example implementations also include a method of extracting communication from body position, by transforming one or more training body position inputs by a principal component analysis, generating training input to a support vector machine (SVM) based on a target body (Continued)

position, and generating one or more SVM classification outputs associated with the target body position.

42 Claims, 17 Drawing Sheets

(56)                    References Cited

U.S. PATENT DOCUMENTS

| | | | | |
|---|---|---|---|---|
| 3,845,771 A * | 11/1974 | Vise | A61N 1/04 | 606/49 |
| 4,668,545 A * | 5/1987 | Lowe | H05K 9/00 | 428/36.1 |
| 4,741,087 A * | 5/1988 | Plummer, Jr. | D04C 1/02 | 138/123 |
| 5,182,779 A * | 1/1993 | D'Agostino | G01D 5/35316 | 385/13 |
| 6,325,768 B1 * | 12/2001 | Williams | A61B 5/4528 | 600/595 |
| 6,701,296 B1 * | 3/2004 | Kramer | G06F 1/163 | 370/545 |
| 7,240,599 B2 * | 7/2007 | Nolan | H01B 5/104 | 87/8 |
| 7,269,516 B2 * | 9/2007 | Brunner | G16B 40/20 | 382/128 |
| 7,516,605 B2 * | 4/2009 | Goldwater | D07B 1/145 | 57/264 |
| 7,752,830 B2 * | 7/2010 | Goldwater | D02G 3/441 | 57/238 |
| 8,528,117 B2 * | 9/2013 | Asiaghi | A41D 19/01576 | 2/167 |
| 9,069,385 B1 * | 6/2015 | Lynch | G06F 3/014 | |
| 9,075,022 B2 * | 7/2015 | Huntley | G01N 27/90 | |
| 9,218,058 B2 * | 12/2015 | Bress | G06F 3/017 | |
| 9,417,693 B2 * | 8/2016 | Seth | G06F 3/014 | |
| 9,710,060 B2 * | 7/2017 | McMillen | G01L 1/18 | |
| 9,846,482 B2 * | 12/2017 | Seth | G06F 3/017 | |
| 9,884,179 B2 * | 2/2018 | Bouton | A61N 1/0456 | |
| 10,319,257 B2 * | 6/2019 | Bavunoglu | G06F 3/162 | |
| 10,321,873 B2 * | 6/2019 | Connor | A61B 5/6831 | |
| 10,602,965 B2 * | 3/2020 | Connor | G06F 3/011 | |
| 10,649,528 B2 * | 5/2020 | Hoen | D03D 1/0082 | |
| 11,157,086 B2 * | 10/2021 | Cipoletta | G06F 3/017 | |
| 11,262,851 B2 * | 3/2022 | Cipoletta | H04W 4/026 | |
| 11,934,583 B2 * | 3/2024 | Leaper | G06F 3/04817 | |
| 12,134,841 B1 * | 11/2024 | Owens, Jr. | D02G 3/12 | |
| 2001/0040550 A1 * | 11/2001 | Vance | G06F 3/014 | 345/156 |
| 2005/0082083 A1 * | 4/2005 | Nolan | A01K 3/005 | 174/128.2 |
| 2005/0231207 A1 * | 10/2005 | Goldwater | D07B 1/145 | 324/522 |
| 2006/0253167 A1 * | 11/2006 | Kurtz | A61B 5/24 | 607/48 |
| 2009/0160426 A1 * | 6/2009 | Goldwater | D07B 1/145 | 324/71.1 |
| 2012/0319940 A1 * | 12/2012 | Bress | G06F 3/014 | 345/156 |

| | | | | |
|---|---|---|---|---|
| 2013/0319054 A1 * | 12/2013 | Asiaghi | A41D 19/00 | 66/174 |
| 2014/0075645 A1 * | 3/2014 | Asiaghi | G06F 3/0393 | 2/167 |
| 2015/0306373 A1 * | 10/2015 | Bouton | A61N 1/36003 | 607/148 |
| 2016/0055936 A1 * | 2/2016 | Head | D04C 1/12 | 87/8 |
| 2016/0070347 A1 * | 3/2016 | McMillen | H03K 17/964 | 345/173 |
| 2016/0124508 A1 * | 5/2016 | Williams | A41D 19/0006 | 2/167 |
| 2016/0162022 A1 * | 6/2016 | Seth | G06F 3/017 | 345/156 |
| 2016/0284236 A1 * | 9/2016 | Bavunoglu | G06F 3/014 | |
| 2016/0338644 A1 * | 11/2016 | Connor | A61B 5/1126 | |
| 2018/0154133 A1 * | 6/2018 | Bouton | A61N 1/0484 | |
| 2018/0242908 A1 | 8/2018 | Sazonov et al. | | |
| 2018/0303383 A1 * | 10/2018 | Connor | G06F 3/014 | |
| 2019/0113972 A1 * | 4/2019 | Hoen | D03D 1/0082 | |
| 2019/0354179 A1 * | 11/2019 | Hoen | D03D 1/0088 | |
| 2021/0349542 A1 * | 11/2021 | Cipoletta | G06F 1/163 | |
| 2022/0165393 A1 * | 5/2022 | Inz | A61B 5/7264 | |
| 2023/0011723 A1 * | 1/2023 | Chidichimo | D03D 15/283 | |
| 2024/0035209 A1 * | 2/2024 | Uno | H01G 5/18 | |
| 2024/0065554 A1 * | 2/2024 | Serval | G06V 20/20 | |
| 2024/0085990 A1 * | 3/2024 | Ang | G06F 1/163 | |

FOREIGN PATENT DOCUMENTS

| | | | | | |
|---|---|---|---|---|---|
| CN | 113261726 A | * | 8/2021 | | G06F 3/017 |
| CN | 110794960 B | * | 2/2024 | | G06F 3/014 |
| DE | 212014000212 U1 | * | 6/2016 | | G09B 21/009 |
| FR | 2966319 A1 | | 4/2012 | | |
| KR | 20200104998 A | * | 9/2020 | | G09B 21/009 |
| KR | 20210008911 A | * | 1/2021 | | G06F 3/014 |
| KR | 20210153163 A | * | 12/2021 | | G06F 3/017 |
| KR | 102433382 B1 | * | 8/2022 | | G06F 3/014 |
| KR | 20250048613 A | * | 4/2025 | | G01S 19/13 |
| WO | WO-2014089266 A2 | * | 6/2014 | | A61N 1/0452 |
| WO | WO-2015116008 A1 | * | 8/2015 | | G06F 3/014 |
| WO | WO-2016/019087 A1 | | 2/2016 | | |
| WO | WO-2019/032217 A2 | | 2/2019 | | |

OTHER PUBLICATIONS

Sim et al., "Stretchable Triboelectric Fiber for Self-powered Kinematic Sensing Textile." Scientific Reports | 6:35153 | DOI: 10.1038/srep35153, Oct. 11, 2016 (Oct. 11, 2016), entire document especially pp. 1-6, [online] <https://www.nature.com/articles/srep35153.pdf>.

Zhu et al., "Highly Stretchable All-Rubber-Based Thread-Shaped Wearable Electronics for Human Motion Energy-Harvesting and Self-Powered Biomechanical Tracking." Nanoscale A Research Letters, Year 2019, https://doi.org/1 O .1186/s 11671-019-3085-9, pp. 1-3, [online] <https://nanoscalereslett.springeropen.com/track/pdf/10.1186/s11671-019-3085-9.pdf >.

* cited by examiner

100B

300

320

320

310

500

600

800A

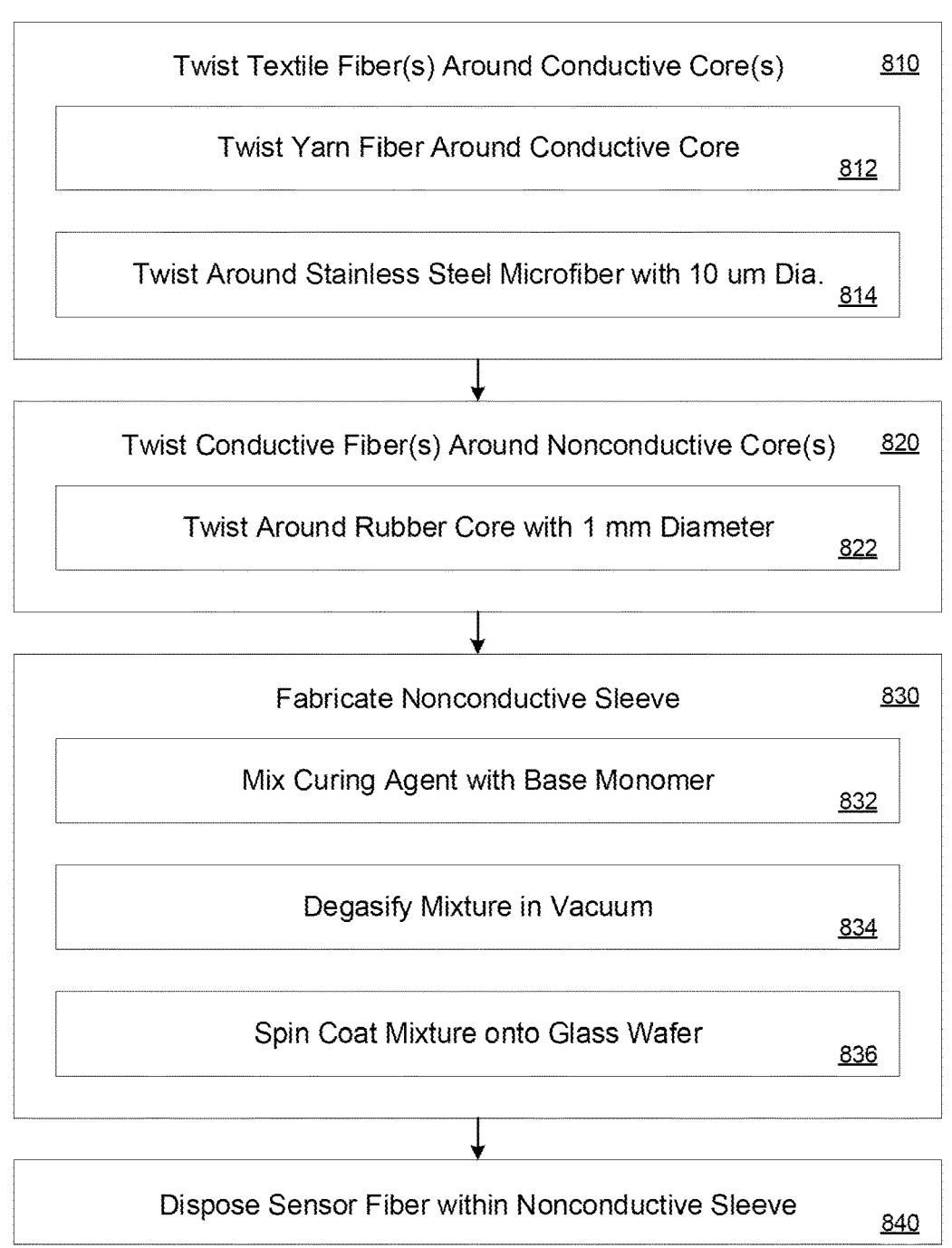

Twist Textile Fiber(s) Around Conductive Core(s)    810

Twist Yarn Fiber Around Conductive Core    812

Twist Around Stainless Steel Microfiber with 10 um Dia.    814

Twist Conductive Fiber(s) Around Nonconductive Core(s)    820

Twist Around Rubber Core with 1 mm Diameter    822

Fabricate Nonconductive Sleeve    830

Mix Curing Agent with Base Monomer    832

Degasify Mixture in Vacuum    834

Spin Coat Mixture onto Glass Wafer    836

Dispose Sensor Fiber within Nonconductive Sleeve    840

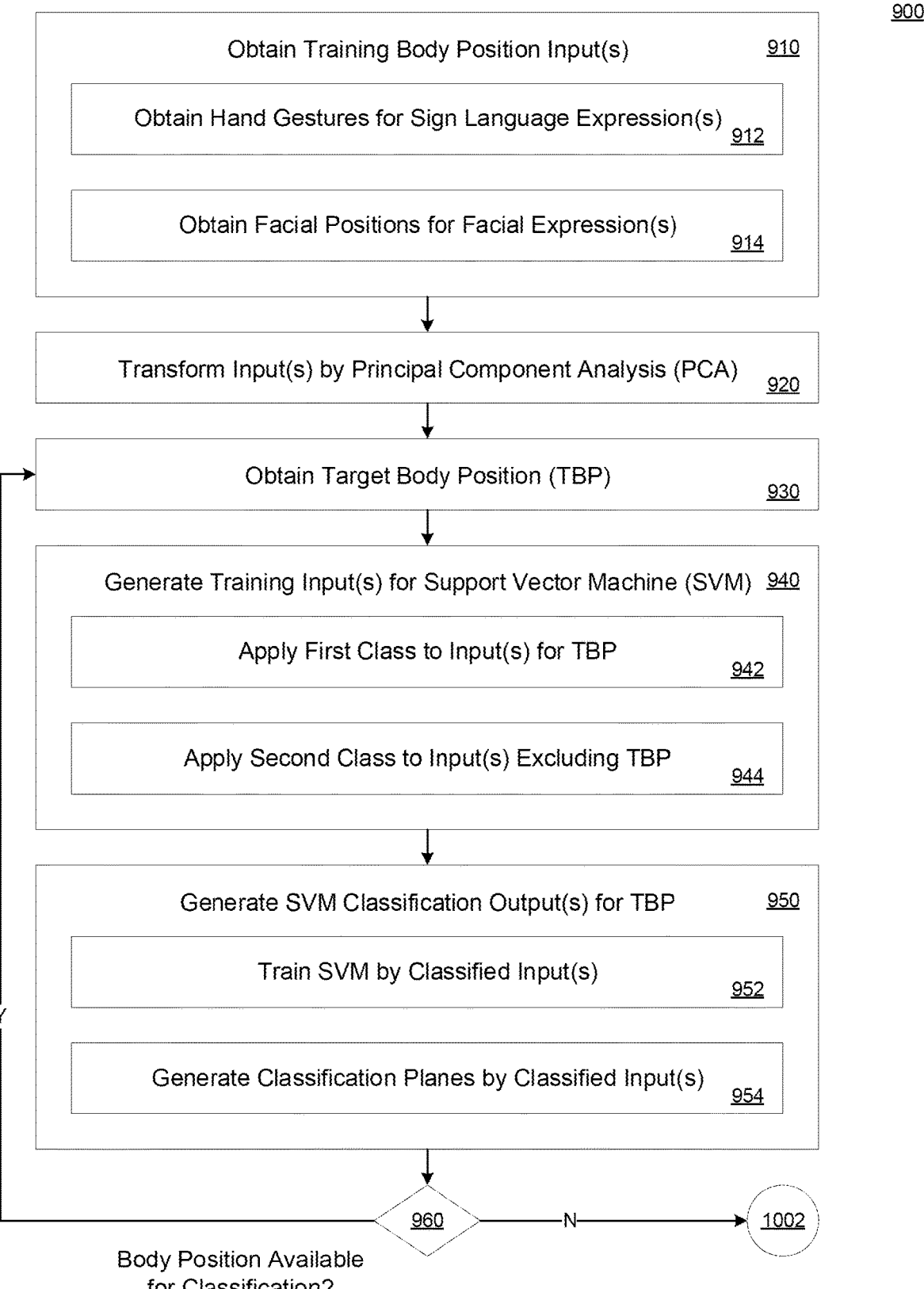

900

Obtain Training Body Position Input(s)    910

Obtain Hand Gestures for Sign Language Expression(s)   912

Obtain Facial Positions for Facial Expression(s)   914

Transform Input(s) by Principal Component Analysis (PCA)   920

Obtain Target Body Position (TBP)   930

Generate Training Input(s) for Support Vector Machine (SVM)   940

Apply First Class to Input(s) for TBP   942

Apply Second Class to Input(s) Excluding TBP   944

Generate SVM Classification Output(s) for TBP   950

Train SVM by Classified Input(s)   952

Generate Classification Planes by Classified Input(s)   954

Y

960  —N—  1002

Body Position Available
for Classification?

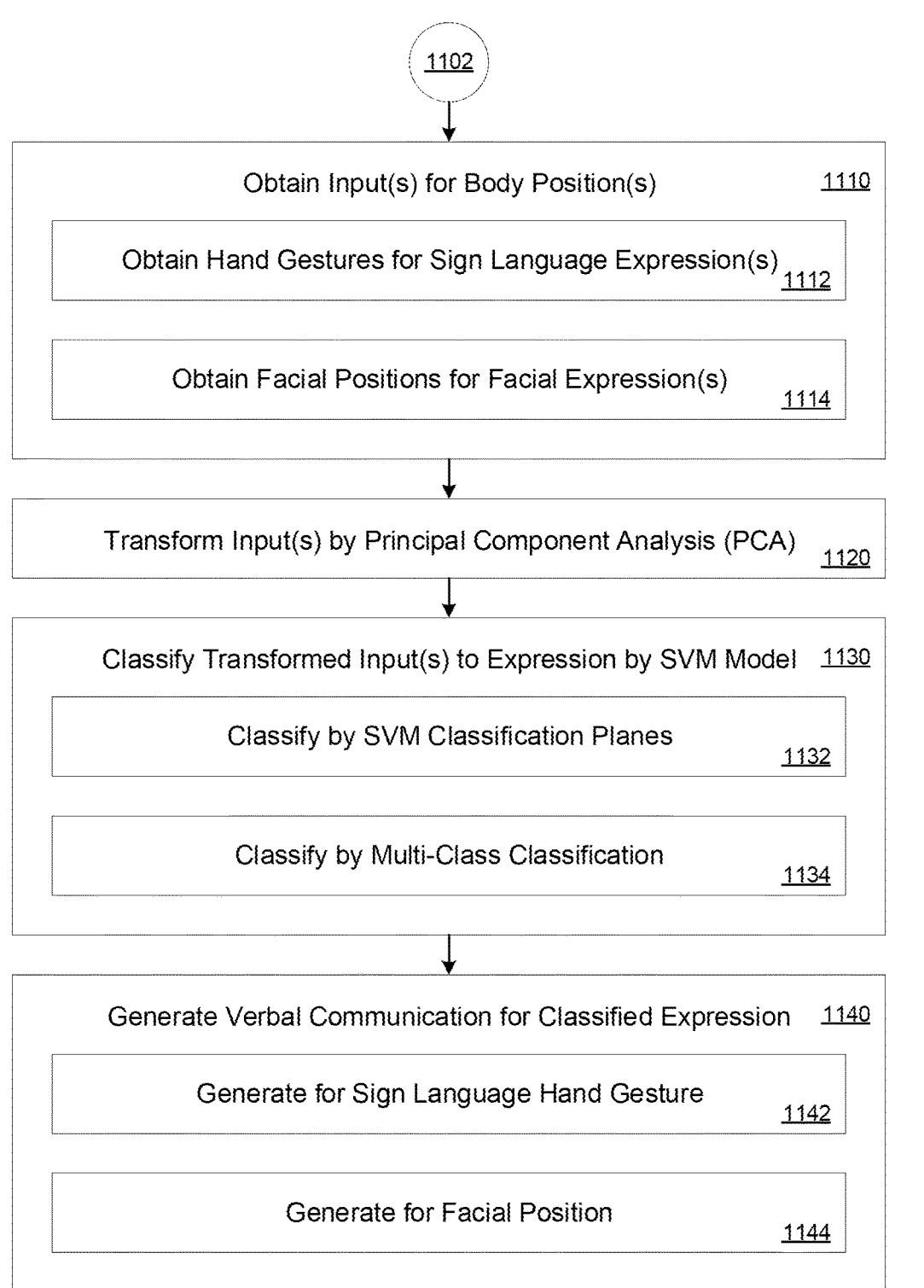

1102

Obtain Input(s) for Body Position(s)    1110

Obtain Hand Gestures for Sign Language Expression(s) 1112

Obtain Facial Positions for Facial Expression(s)

1114

Transform Input(s) by Principal Component Analysis (PCA)    1120

Classify Transformed Input(s) to Expression by SVM Model    1130

Classify by SVM Classification Planes

1132

Classify by Multi-Class Classification

1134

Generate Verbal Communication for Classified Expression    1140

Generate for Sign Language Hand Gesture

1142

Generate for Facial Position

METHOD AND WEARABLE DEVICE FOR DETECTING AND VERBALIZING NONVERBAL COMMUNICATION

CROSS-REFERENCE TO RELATED PATENT APPLICATIONS

This application is a National Stage Entry under 35 U.S.C. § 371 of International Application No. PCT/US2021/015528, filed Jan. 28, 2021, which claims priority under 35 U.S.C. § 119 to U.S. Provisional Patent Application Ser. No. 62/967,509, entitled "INTEGRATED STRETCHABLE SENSOR ARRAYS FOR WEARABLE SIGN LANGUAGE TRANSLATION TO VOICE," filed Jan. 29, 2020, the contents of each application being hereby incorporated by reference in their entirety and for all purposes as if completely and fully set forth herein.

TECHNICAL FIELD

The present implementations relate generally to sensor devices, and more particularly to detecting and verbalizing nonverbal communication.

BACKGROUND

Signed languages are not as pervasive a conversational medium as spoken languages due to lack of instruction of the former and linguistic pervasiveness of the latter. This has led to a communication barrier between individuals communicating with sign language ("signers") and individuals communicating with spoken languages ("non-signers").

SUMMARY

Present implementations are directed to sensor technology based on the coupling of triboelectrification and electrostatic induction to promote communication between signers and non-signers. A wearable sign-to-speech translation system, assisted by machine learning, can accurately translate hand gestures of sign languages, including but not limited to American Sign Language, into speech. A wearable sign-to-speech translation system in accordance with present implementations includes yarn-based stretchable sensor arrays and a wireless printed circuit board. Example implementations demonstrate high sensitivity to input and fast response times for detection, allowing real-time translation of signs into spoken words. Example implementations can achieve a recognition accuracy rate to 98.63% and a recognition time of less than one second. However, conventional systems may not effectively detect nonverbal input and generate corresponding verbal output with sufficient speed or accuracy. Thus, a technological solution for detecting and verbalizing nonverbal communication is desired.

Example implementations include a triboelectric sensor device with a substantially cylindrical nonconductive core, and a conductive fiber substantially helically disposed around the conductive core and in an axial direction thereof.

Example implementations also include a method of manufacturing a deformable sensor array for body position detection, by twisting a textile fiber around a substantially cylindrical conductive core to form a conductive fiber, twisting the conductive fiber around a substantially cylindrical nonconductive core to form a nonconductive sleeve, and disposing the sensor fiber within the nonconductive sleeve.

Example implementations also include a method of extracting communication from body position, by transforming one or more training body position inputs by a principal component analysis, generating training inputs to a support vector machine (SVM) based on a target body position, and generating one or more SVM classification outputs associated with the target body position.

Example implementations also include a method of detecting body position by a deformable sensor array, by deforming a sensor fiber in an axial direction thereof, increasing friction contact within the sensor fiber, generating a triboelectric voltage at a conductive fiber of the sensor fiber, obtaining a body position input based on the triboelectric voltage, transforming the body position input based on a principal component analysis, classifying body position by a trained SVM to an expression, and generating a verbal communication based on the classified body position.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 8A illustrates a first example method of manufacturing a wearable device for verbalizing nonverbal communication, in accordance with present implementations.

FIG. 9 illustrates an example method of training a machine learning system associated with a wearable device for verbalizing nonverbal communication, in accordance with present implementations.

FIG. 11 illustrates an example method of verbalizing nonverbal communication further to the example method of FIG. 10.

DETAILED DESCRIPTION

Figure 1A:
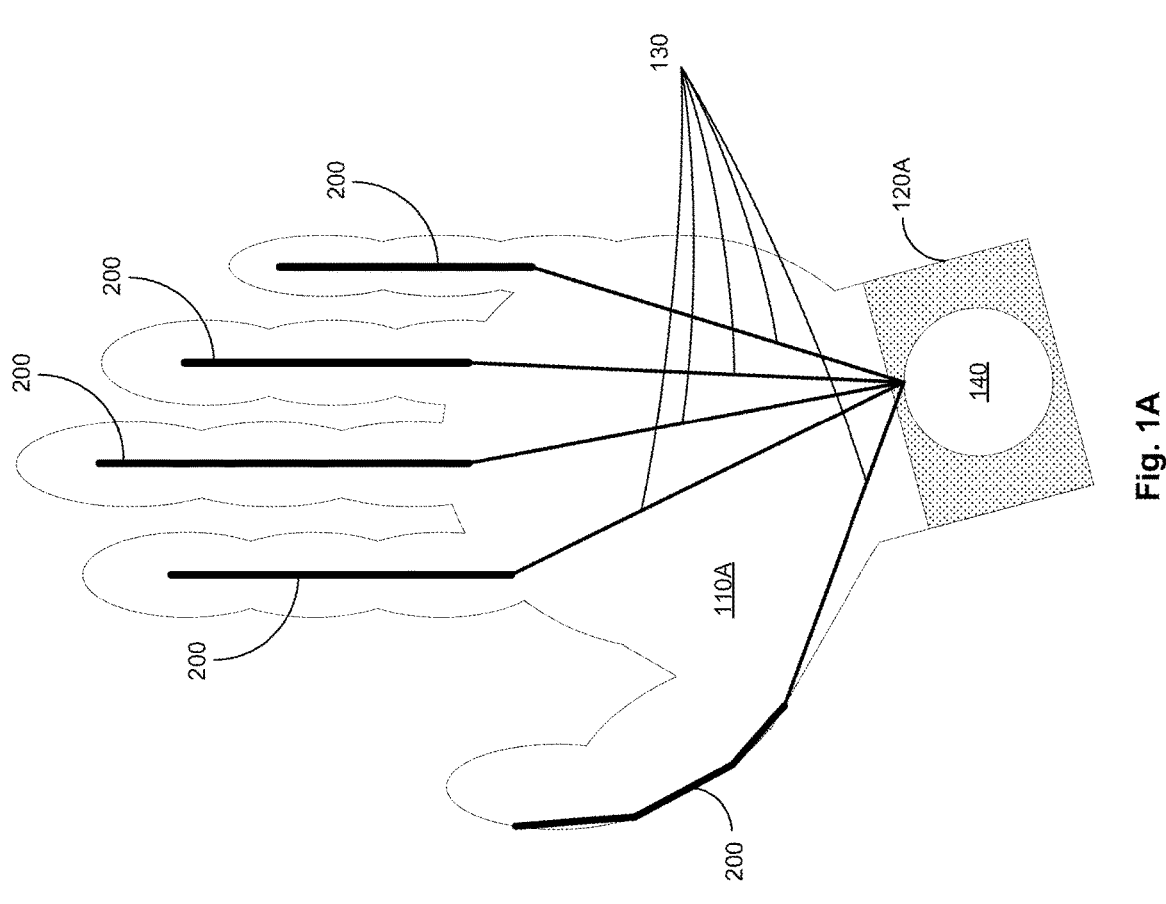
FIG. 1A illustrates a first example wearable device for verbalizing nonverbal communication, in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of inter-change of some or all of the described or illustrated ele-ments. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implemen-tations. Implementations described as being implemented in software should not be limited thereto, but can include implementations implemented in hardware, or combinations of software and hardware, and vice-versa, as will be appar-ent to those skilled in the art, unless otherwise specified herein. In the present specification, an implementation showing a singular component should not be considered limiting; rather, the present disclosure is intended to encom-pass other implementations including a plurality of the same component, and vice-versa, unless explicitly stated other-wise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Signed languages are created by hands, face and body, and perceived primarily visually. However, without prior knowl-edge of sign language, it is difficult for non-signers to perceive and understand communication by this visual con-versational medium, creating a communication barrier between signers and non-signers. Wearable electronics have a number compelling features, including light weight, low cost, high flexibility, and conformability. Thus, present implementations including wearable electronics can provide a technological solution to this communication barrier in the form of wearable sign language translation devices.

Present implementations thus include a wearable sign-to-speech translation system for real-time translation of sign language into audio speech. Analog triboelectrification and electrostatic induction-based signals generated by sign lan-guage components, including hand configurations and motions, and facial expressions, can be converted to the digital domain by example wearable sign-to-speech translation systems to implement sign-to-speech translation. Present implementations further demonstrate mechanical and chemical durability, high sensitivity, quick response times, and high stretchability. Example implementations can acquire sign language hand gestures based on American Sign Language (ASL), and recognize sign language com-munication with a machine learning algorithm at a high recognition rate of 98.63% and a short recognition time of less than one second.

Present implementations can generate electrical response through a change in contact between two dissimilar soft materials with opposite triboelectric polarizations, to con-vert small tensile force or pressure into electricity. A surface charging effect provides a simple, reliable, cost-effective, and efficient means for sign-to-speech translation. Example implementations demonstrate sensitivity of 2.47 V across a strain range of up to 90%. Systems in accordance with present implementations are also resistant to mechanical fatigue, hold strong chemical stability against environmental disturbance, and support all sign language components, including finger spelling, body movements and facial expressions. In some implementations, sensor fibers are affixed to one or more of a hand, finger, wrist, elbow, and neck of a signer. It is to be understood that that sensor fibers can be affixed directed to a body location of the signer, or can be affixed to a garment or object manipulable by the signer. Example implementations in accordance with present implementations can include low-cost materials, and can be scalable for mass production. In some implementations, fibrous structure design allows the example wearable device to be easily integrated with common gloves and clothing. Thus, in some implementations, the example wearable device based wearable sign-to-speech translation system can be constructed of components costing hundreds of times less than conventional systems.

FIG. 1A illustrates a first example wearable device for verbalizing nonverbal communication, in accordance with present implementations. As illustrated by way of example in FIG. 1A, a first example wearable device for verbalizing nonverbal communication 100A includes a plurality of sen-sor fibers 200 affixed to a biological surface of a hand 110A, an electronics wrist mount 120A, a plurality of sensor leads 130, and a body position acquisition system 140 affixed to the electronics wrist mount 120A. The wearable sign-to-speech translation system can include yarn based stretchable sensor arrays and a wireless printed circuit board. In some implementations, one or more yarn-based stretchable sensor fibers 200 conform to the skin of a human finger under both releasing and stretching states. Thus, in some implementa-tions, hand gesture movements are converted by sensor arrays into electrical signals.

The sensor fibers 200 are operable to generate a tribo-electric voltage in response to deformation of the sensor fiber axially. Thus, the sensor fibers 200 can respond to movement of a particular body position with a correspond-ing triboelectric voltage having a magnitude corresponding to the magnitude of the movement. As one example, move-ment of a finger from an open-hand position to a closed-hand position can result in a triboelectric response voltage of greater magnitude than movement of that finger from a partially open-hand position to a closed-hand position. In some implementations, extent of movement of a finger or body part is represented as a voltage peaks in an acquired voltage signal from the sensor fibers 200. Thus, motion status of each finger or the like can be reliably expressed as electrical signals from the sensing unit.

The biological surface of the hand 110A can have affixed thereon one or more of the sensor fibers 200. Affixing the sensor fibers 200 directly to the biological surface of the hand 110A can reduce the weight, volume, and cost of the first example wearable device relative to example implementations having the sensor fibers 200 disposed on textile or other material deformable with the movement of the hand. For example, an example wearable device in accordance with present implementations is very lightweight, and can achieve a total mass of substantially 25.8 g. The electronics wrist mount 120A is operable to affix the body position acquisition system 140 to the biological surface of the hand 110A

The sensor leads 130 operatively couple each of the sensor fiber 200 to the body position acquisition system 140. In some implementations, the sensor leads are couple to one or more conductive fibers, or conductive portions of conductive fibers, of each of the sensor fibers 200. In some implementations, the sensor leads provide independent and distinct responses from each of the sensor fibers 200 to the body position acquisition system 140, corresponding to a body position input based on movement of multiple fingers, other body parts, or the like. In some implementations, the sensor leads 130 are operable to communicate one or more instructions, signals, conditions, states, or the like between one or more of the sensor fiber 200 and the body position acquisition system 140. In some implementations, the sensor leads 130 include one or more digital, analog, or like communication channels, lines, traces, or the like. As one example, the sensor leads 130 are or include at least one serial or parallel communication line among multiple communication lines of a communication interface.

The body position acquisition system 140 is operable to obtain and process triboelectric voltage or the like obtained from one or more of the sensor fiber 200 by the sensor leads 130. In some implementations, the wireless PCB worn on the wrist integrates multiple functions, including but not limited to, signal conditioning, processing, and wireless transmission, in one or more integrated circuit components or the like.

Figure 1B:
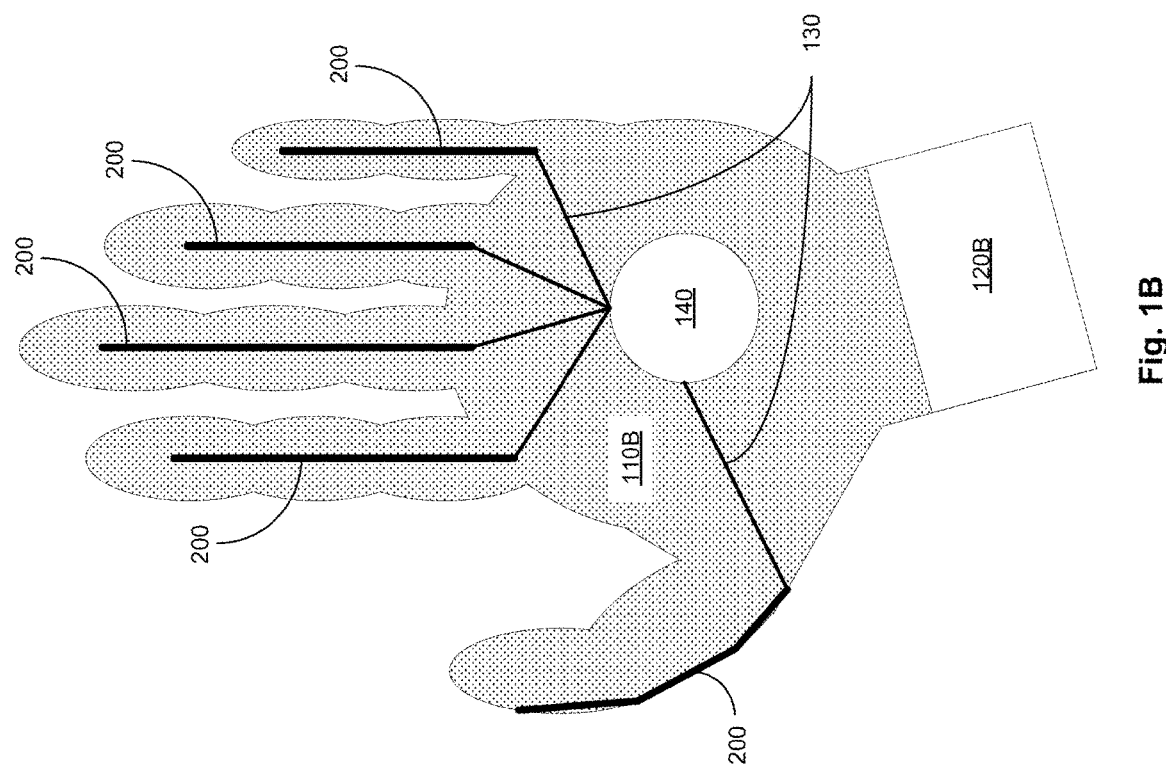
FIG. 1B illustrates a second example wearable device for verbalizing nonverbal communication, in accordance with present implementations.

FIG. 1B illustrates a second example wearable device for verbalizing nonverbal communication, in accordance with present implementations. As illustrated by way of example in FIG. 1B, a second example wearable device for verbalizing nonverbal communication 100B includes the plurality of sensor fibers 200 affixed to a glove 110B wearable on a hand 120B, the plurality of sensor leads 130, and the electronics package 140 affixed to the glove 110B. The glove 110B can comprise any sufficiently deformable, flexible, pliable, or like material allowing for substantially unimpeded motion of the hand and fingers. In some implementations, a system weight with the glove 110B is substantially 55.8 g, where the sensor fibers weigh 8 g, the body position acquisition system 140 excluding an onboard battery weighs 8.8 g, the onboard battery weighs 9 g, and the glove 110B weighs 30 g.

Figure 2:
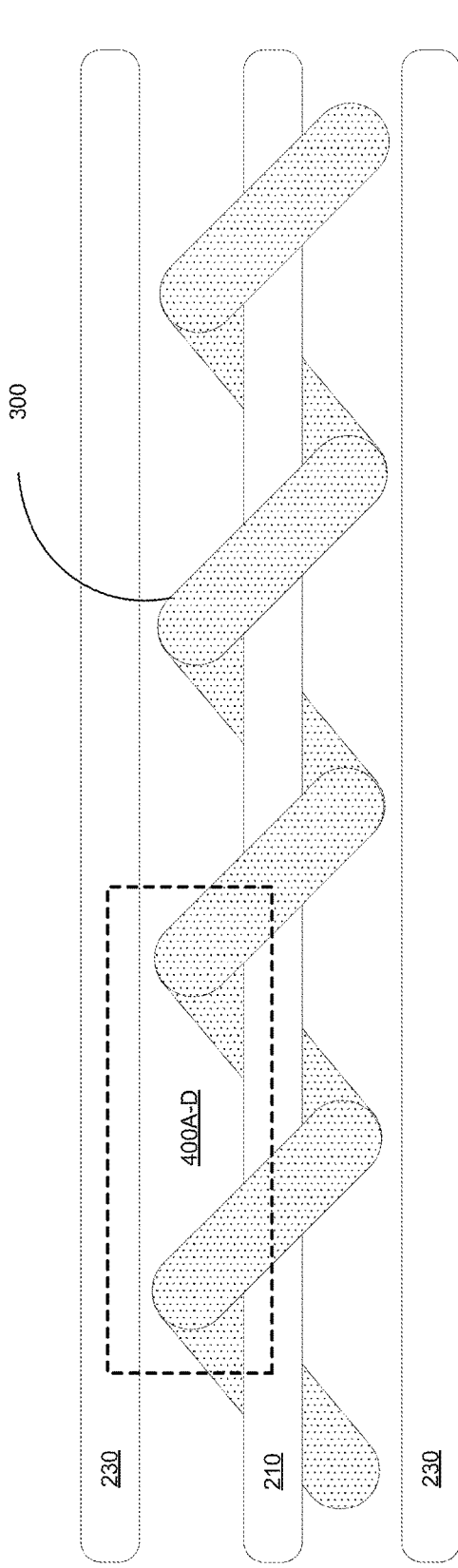
FIG. 2 illustrates an example sensor fiber of a wearable device for verbalizing nonverbal communication, in accordance with present implementations.

FIG. 2 illustrates an example sensor fiber of a wearable device for verbalizing nonverbal communication, in accordance with present implementations. As illustrated by way of example in FIG. 2, an example sensor fiber 200 includes a nonconductive core 210, a conductive fiber 300, and a nonconductive sleeve 230. FIG. 2 further illustrates a cross sectional inset view corresponding to FIGS. 4A-D. The example sensor fiber 200 can generate electrical responses to convert, among other communication, sign language components into distinguishable electrical signals, and input those voltage responses to the body position acquisition system 140.

The nonconductive core 210 is a substantially cylindrical tube, wire or the like including nonconductive material. In some implementations, the nonconductive material is rubber or the like. In some implementations, the nonconductive core 210 has a substantially cylindrical shape with a diameter of substantially 1 millimeter (mm). The conductive fiber 300 is twisted, spun, or the like around the nonconductive core 210 in an axial direction thereof in a spiral, helical, or like shape. It is to be understood that the nonconductive core 210 may have an arbitrary number of conductive fibers disposed thereon in a configuration corresponding to the conductive fiber 300. The nonconductive sleeve 230 is a substantially cylindrical and hollow tube or the like including nonconductive material. In some implementations, the nonconductive sleeve is or includes Polydimethylsiloxane (PDMS).

The example sensor fiber 200 can include a coiled structure to ensures that the conductive fiber 300 maintains sufficient electrical conductivity even under extreme stretching. Thus, in some implementations, the coiled structure increases sensitivity and durability of the sensing units. Different levels of axial tensile strain for both the nonconductive sleeve 230 and the conductive fiber 300 induce constant change in contact area between the two during the stretch-release cycles. As a result, an electrical potential can be built up due to the electron affinity difference. As one example, PDMS has strong ability to grab electrons while polyester tends to lose them upon physical contact between the two.

The example sensor fiber 200 is capable of sensitivity supporting a consistent triboelectric response of sufficient magnitude. Sensitivity can be defined as $S=\Delta V/\Delta\varepsilon$, where $\Delta V$ is the relative potential change and $\varepsilon$ is the strain. Sensitivity of 2.47 V can be obtained in a wide strain range of the sensor fiber 200 up to 90%. For example, a 3 cm long sensing unit can be stretched to 6 cm. In some implementations, output signals are stable and uniform at each strain and are proportional to the tensile strain in terms of signal amplitudes, which is an advantage of the unique structural design and reliable electrical output of the sensing unit. The example sensor fiber 200 is also capable of supporting real-time detection and verbalization of sign language input through sufficiently low response time. A stretch-release in one cycle of the sensor fiber 200 indicates a response time less than 15 ms. Thus, the example sensor fiber 200 has advantages in high sensitivity, fast response time, and high stretchability, providing an accurate expression of the sign language components via electrical signals. The example sensor fiber 200 also exhibits resistance to degradation over long-term use, including negligible output voltage changes after 6,000 continuous stretch-release cycles under 70% strain. It is worth noting that the 70% strain change can be far beyond the need for most hand gesture demonstrations. Resistance to degradation is also advantageously demonstrable in the presence of moisture, liquid, or the like. In some implementations, the sensor fiber is a skin-compatible device, and is thus chemically stable when subject to human perspiration.

Figure 3:
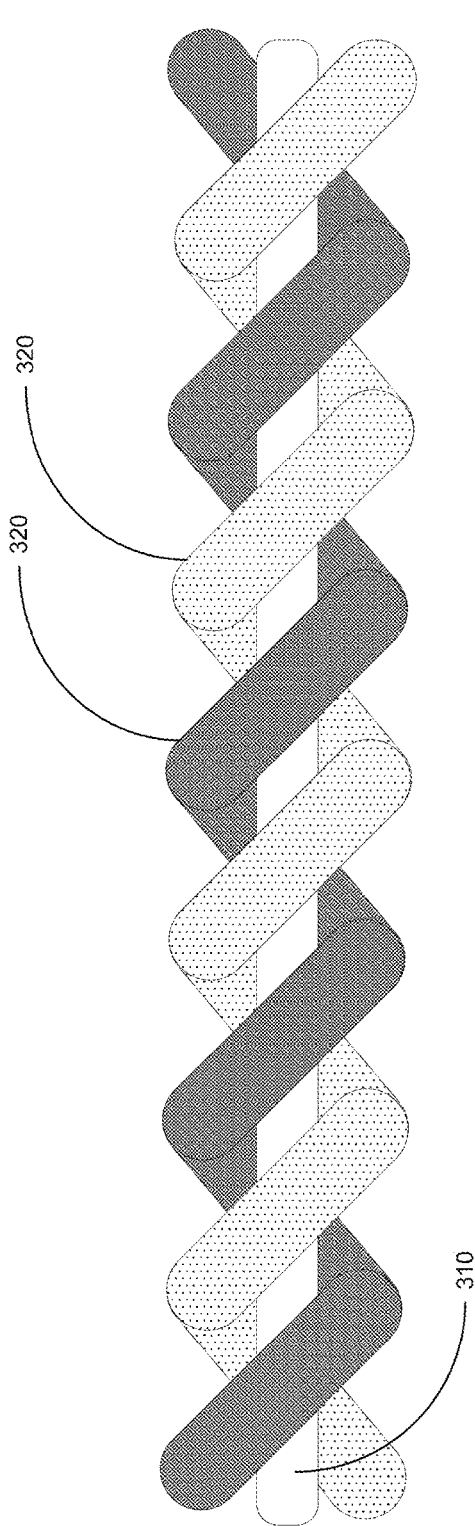
FIG. 3 illustrates an example conductive fiber further to the example sensor fiber of FIG. 2.

FIG. 3 illustrates an example conductive fiber further to the example sensor fiber of FIG. 2. As illustrated by way of example in FIG. 3, an example conductive fiber 300 includes a conductive core 310 and a plurality of nonconductive fibers 320.

The conductive core 310 is a substantially cylindrical tube, wire or the like including conductive material. In some implementations, the conductive material is stainless steel microfiber or the like. In some implementations, the conductive core 310 has a substantially cylindrical shape with a diameter of substantially 10 micrometers (um). The nonconductive fibers 320 are twisted, spun, or the like around the conductive core 310 in an axial direction thereof in a spiral, helical, or like shape. It is to be understood that the conductive core 310 may have a arbitrary number of nonconductive fibers 320 disposed thereon in a configuration corresponding to the nonconductive fibers 320.

FIGS. 4A-D illustrate a plurality of example states of an example sensor fiber of a wearable device for verbalizing nonverbal communication, in accordance with present implementations. It is to be understood that elements of FIGS. 4A-D can correspond to elements of FIGS. 2 and 3 in accordance with the inset therein. Thus, in some implementations, with a cyclic stretching-releasing motion, the sensing unit converts mechanical force of body movement into a periodic electrical signal.

Figure 4A:
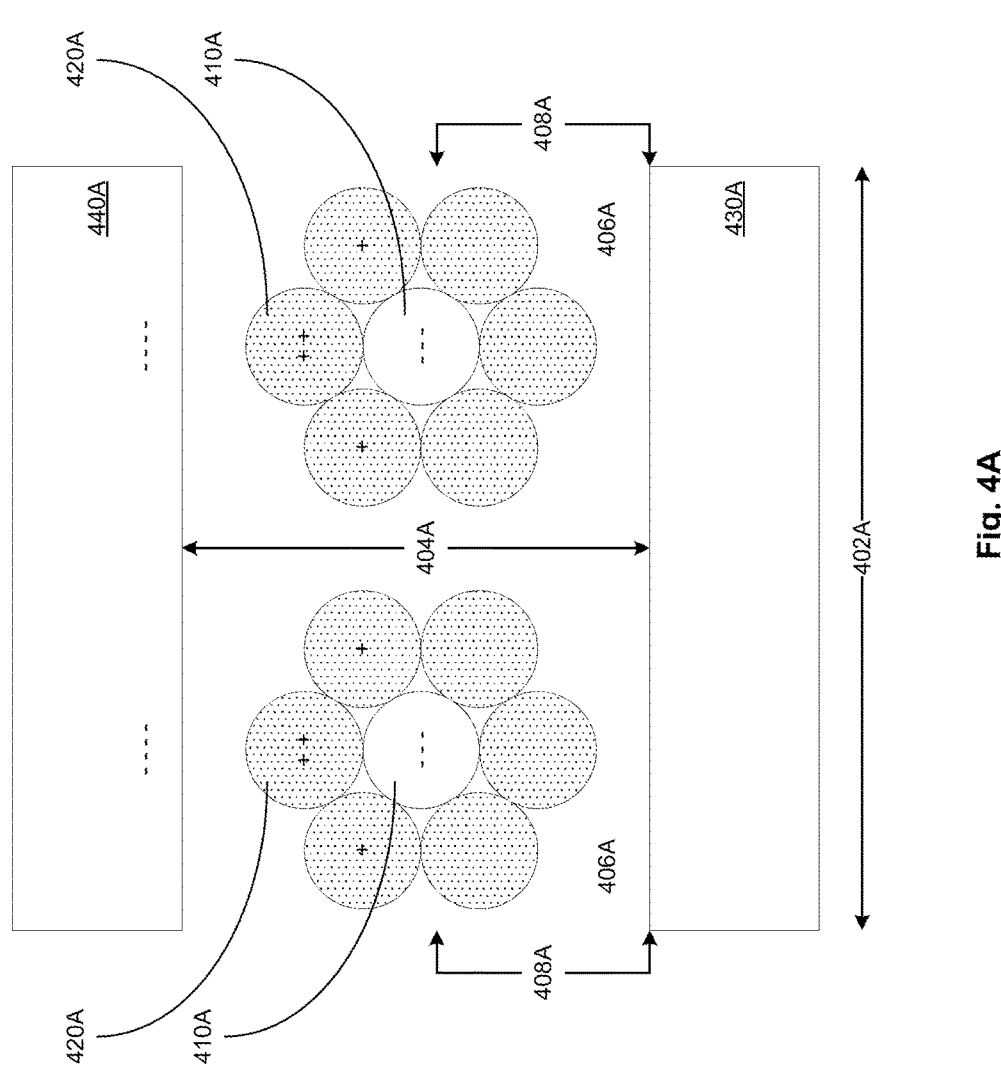
FIG. 4A illustrates an example shortened state of an example sensor fiber of a wearable device for verbalizing nonverbal communication, in accordance with present implementations.

FIG. 4A illustrates an example shortened state of an example sensor fiber of a wearable device for verbalizing nonverbal communication, in accordance with present implementations. As illustrated by way of example in FIG. 4A, an example shortened state 400A of an example sensor fiber includes a plurality of conductive cores 410A, a plurality of nonconductive fibers 420A, a nonconductive core 430A, and a nonconductive sleeve 440A. In the example shortened state, the sensor fiber has a first axial displacement 402A, a first radial displacement 404A, a first triboelectric current 406A, and a first triboelectric voltage 408A. The example sensor fiber in state 400A is in an initial state with no force applied, and can return to state 400A when any stretching, deformation, or like force is released.

In state 400A, the conductive cores 410A have a first negative charge through minimal or no friction contact with the nonconductive core 430A, and the nonconductive sleeve 440A. The nonconductive fibers 420A have various positive charges at fibers closer to the nonconductive sleeve 440A, and a substantially neutral charge closer to the nonconductive core 430A. The first axial displacement 402A is at a minimum, and the first radial displacement 404A is at a maximum, when the sensor fiber is under minimal or no stretching. The first triboelectric current 406A is substantially zero, and the first triboelectric voltage 408A is substantially at a reference level and static.

Figure 4B:
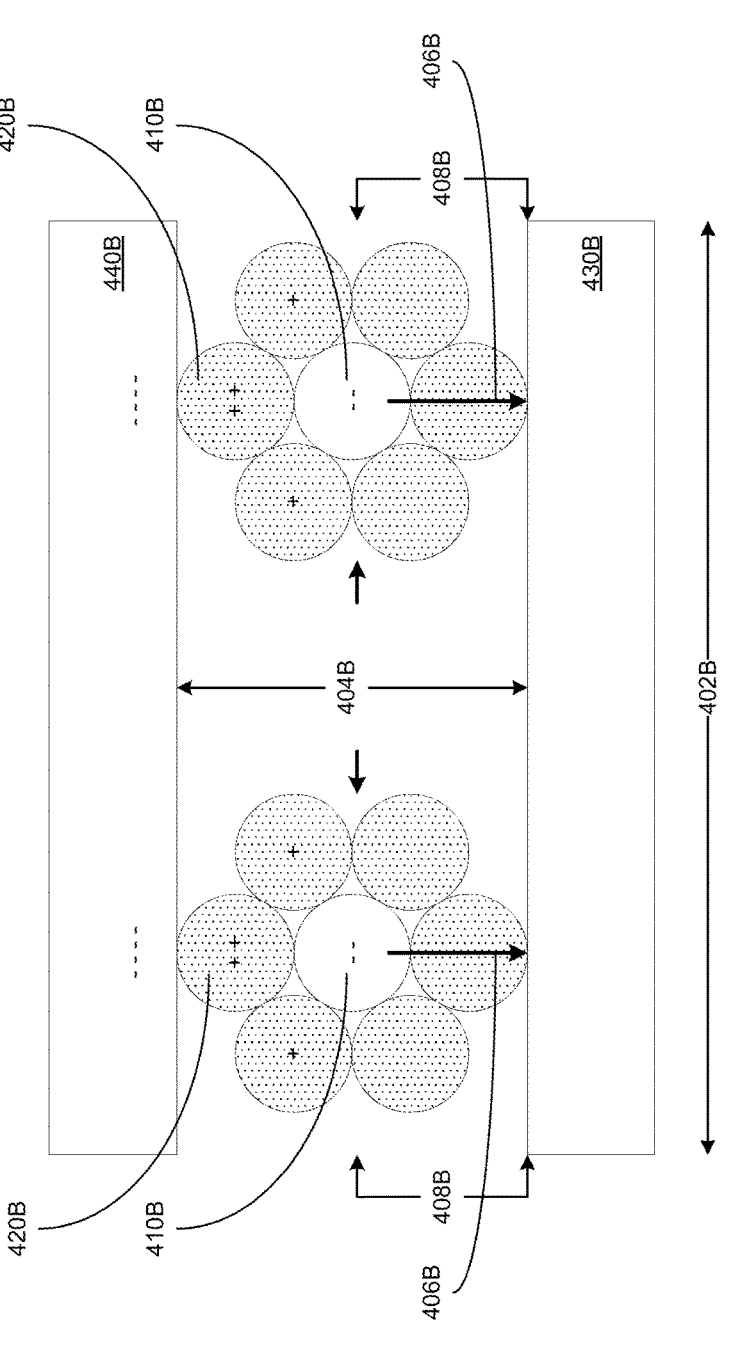
FIG. 4B illustrates an example lengthening state of an example sensor fiber of a wearable device for verbalizing nonverbal communication, in accordance with present implementations.

FIG. 4B illustrates an example lengthening state of an example sensor fiber of a wearable device for verbalizing nonverbal communication, in accordance with present implementations. As illustrated by way of example in FIG. 4B, an example lengthening state 400B of an example sensor fiber includes a plurality of conductive cores 410B, a plurality of nonconductive fibers 420B, a nonconductive core 430B, and a nonconductive sleeve 430B. In the example lengthening state, the sensor fiber has a second axial displacement 402B, a second radial displacement 404B, a second triboelectric current 406B, and a second triboelectric voltage 408B. In the example lengthening state 400B the potential difference starts to drop in the open-circuit condition, and the electrons will flow back to the ground in the short-circuit condition.

In state 400B, the conductive cores 410B have a second negative charge through increasing friction contact with the nonconductive core 430B, and the nonconductive sleeve 440B. The nonconductive fibers 420B have various positive charges at fibers closer to the nonconductive sleeve 440B, and a substantially neutral charge closer to the nonconductive core 430B. The second axial displacement 402B is increasing from a minimum, and the second radial displacement 404B is decreasing from a maximum, when the sensor fiber is under increasing stretching. The second triboelectric current 406B is greater than zero, and the second triboelectric voltage 408B is above reference level.

Figure 4C:
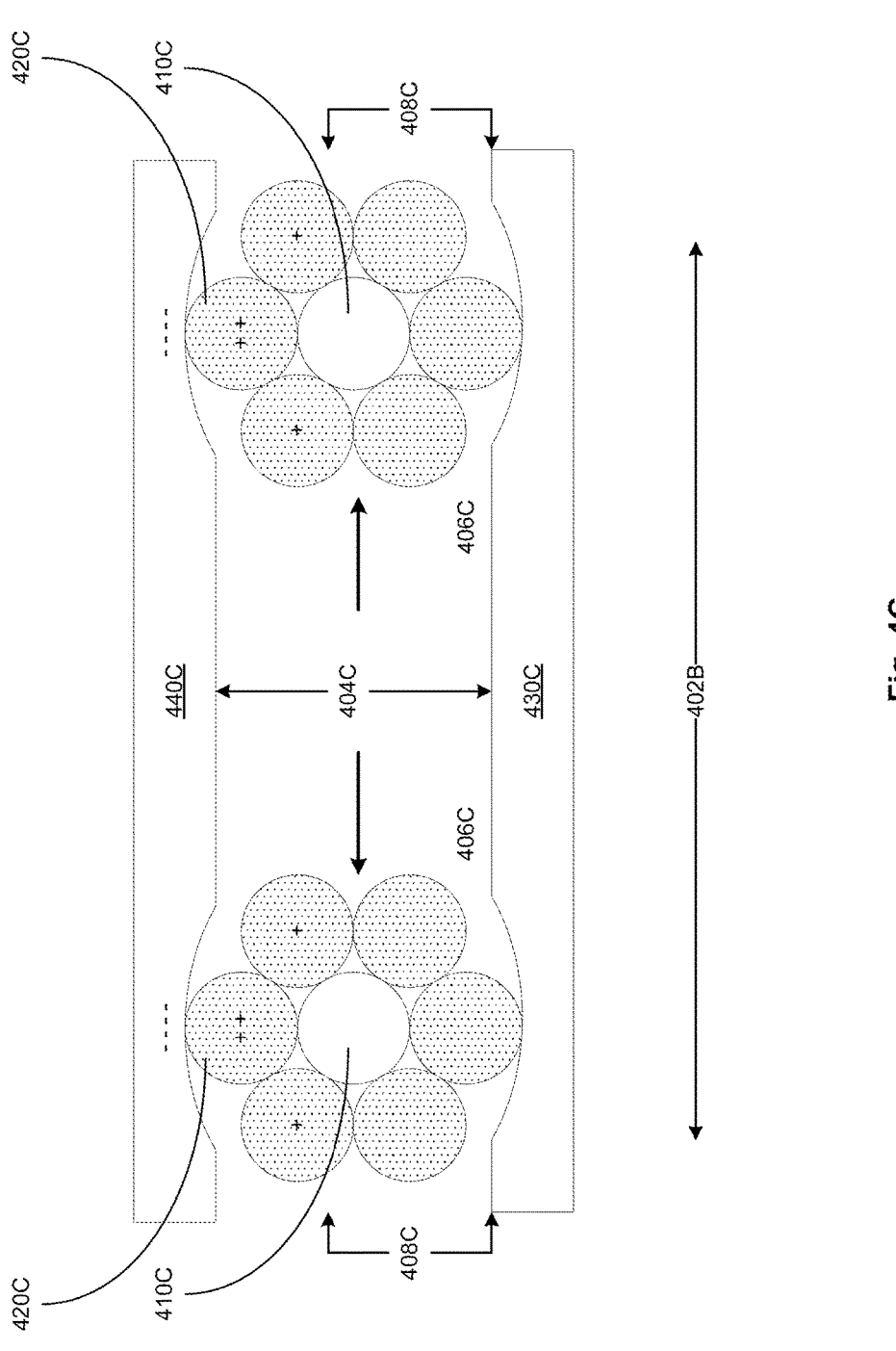
FIG. 4C illustrates an example lengthened state of an example sensor fiber of a wearable device for verbalizing nonverbal communication, in accordance with present implementations.

FIG. 4C illustrates an example lengthened state of an example sensor fiber of a wearable device for verbalizing nonverbal communication, in accordance with present implementations. As illustrated by way of example in FIG. 4C, an example lengthened state 400C of an example sensor fiber includes a plurality of conductive cores 410C, a plurality of nonconductive fibers 420C, a nonconductive core 430C, and a nonconductive sleeve 430C. In the example lengthened state, the sensor fiber has a third axial displacement 402C, a third radial displacement 404C, a third triboelectric current 406C, and a third triboelectric voltage 408C.

In state 400C, the example sensor fiber is stretched to its maximum length, leading to the maximum degree of invagination of the nonconductive sleeve 440C which brings the nonconductive sleeve 440C and nonconductive fibers 420C into a maximum area contact. Since the nonconductive sleeve 440C has a strong ability to grab electrons, and the nonconductive fibers 420C lose them, charges transfer at the interface with a result that the nonconductive sleeve 440C becomes negatively charged while the nonconductive fibers 420C continue with positive charge. The generated charges are balanced by their opposite counterparts due to electrostatic induction. Consequently, there is neither potential difference across the two nor between the conductive cores 410C and ground.

In state 400C, the conductive cores 410C have a substantially neutral charge through increasing friction contact with the nonconductive core 430C, and the nonconductive sleeve 440C. The nonconductive fibers 420C have various positive charges at fibers closer to the nonconductive sleeve 440C, and a substantially neutral charge closer to the nonconductive core 430C. The third axial displacement 402B is at a maximum, and the third radial displacement 404C is at a minimum when the sensor fiber is under maximum stretching. The third triboelectric current 406C is substantially zero, and the third triboelectric voltage 408C is at reference level and static.

Figure 4D:
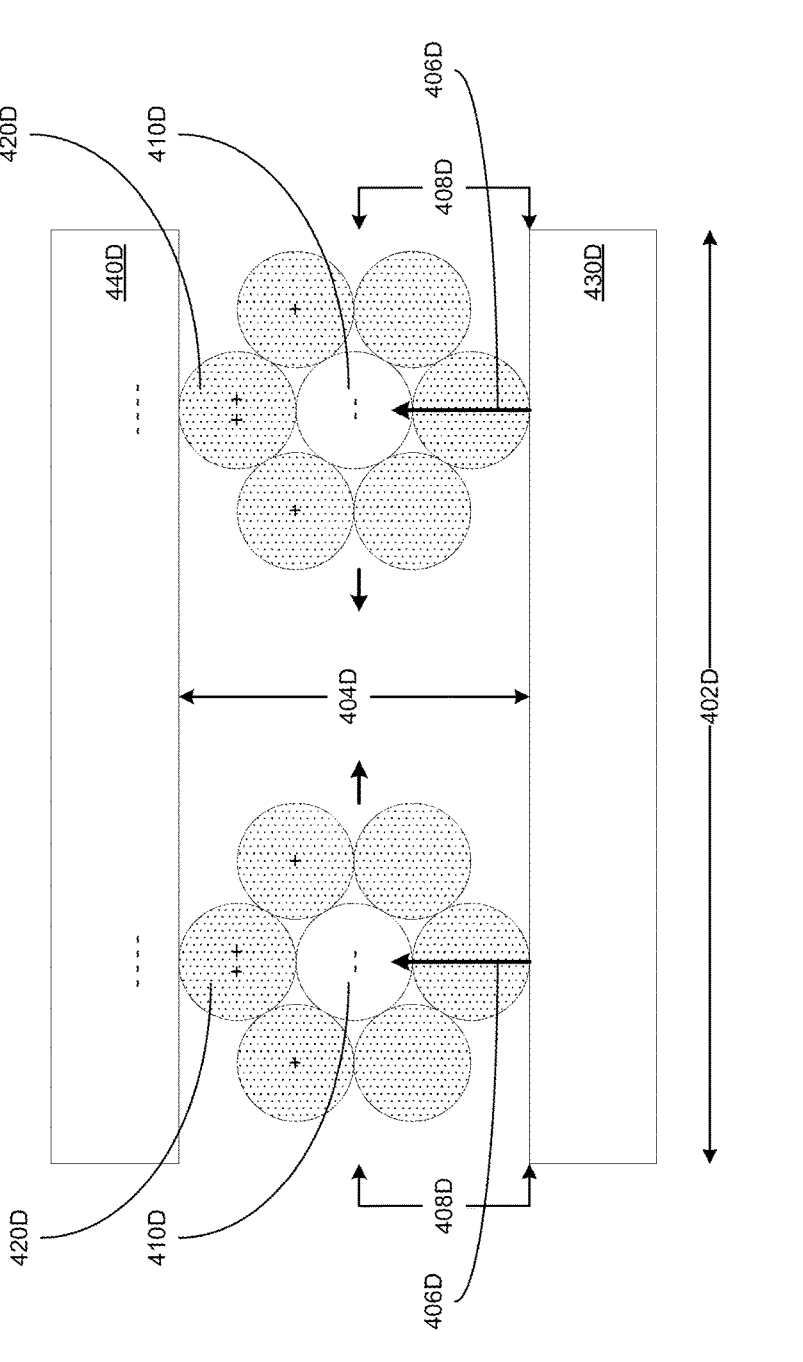
FIG. 4D illustrates an example shortening state of an example sensor fiber of a wearable device for verbalizing nonverbal communication, in accordance with present implementations.

FIG. 4D illustrates an example shortening state of an example sensor fiber of a wearable device for verbalizing nonverbal communication, in accordance with present implementations. As illustrated by way of example in FIG. 4D, an example shortening state 400D of an example sensor fiber includes a plurality of conductive cores 410D, a plurality of nonconductive fibers 420D, a nonconductive core 430D, and a nonconductive sleeve 430D. In the example shortening state, the sensor fiber has a fourth axial displacement 402D, a fourth radial displacement 404D, a fourth triboelectric current 406D, and a fourth triboelectric voltage 408D. In state 400D, as the stretching force is released, the two tribo-charged surfaces begin to and complete separation, resulting in a potential drop. The resulting potential difference can drive free electrons to flow from the ground to the electrode in the short-circuit condition.

In state 400D, the conductive cores 410D have a second negative charge through decreasing friction contact with the nonconductive core 430D, and the nonconductive sleeve 440D. The nonconductive fibers 420D have various positive charges at fibers closer to the nonconductive sleeve 440D, and a substantially neutral charge closer to the nonconductive core 430D. The fourth axial displacement 402D is decreasing from a maximum, and the fourth radial displacement 404D is increasing from a minimum when the sensor fiber is under decreasing stretching. The fourth triboelectric current 406D is negative, and the fourth triboelectric voltage 408D is below reference level.

Figure 5:
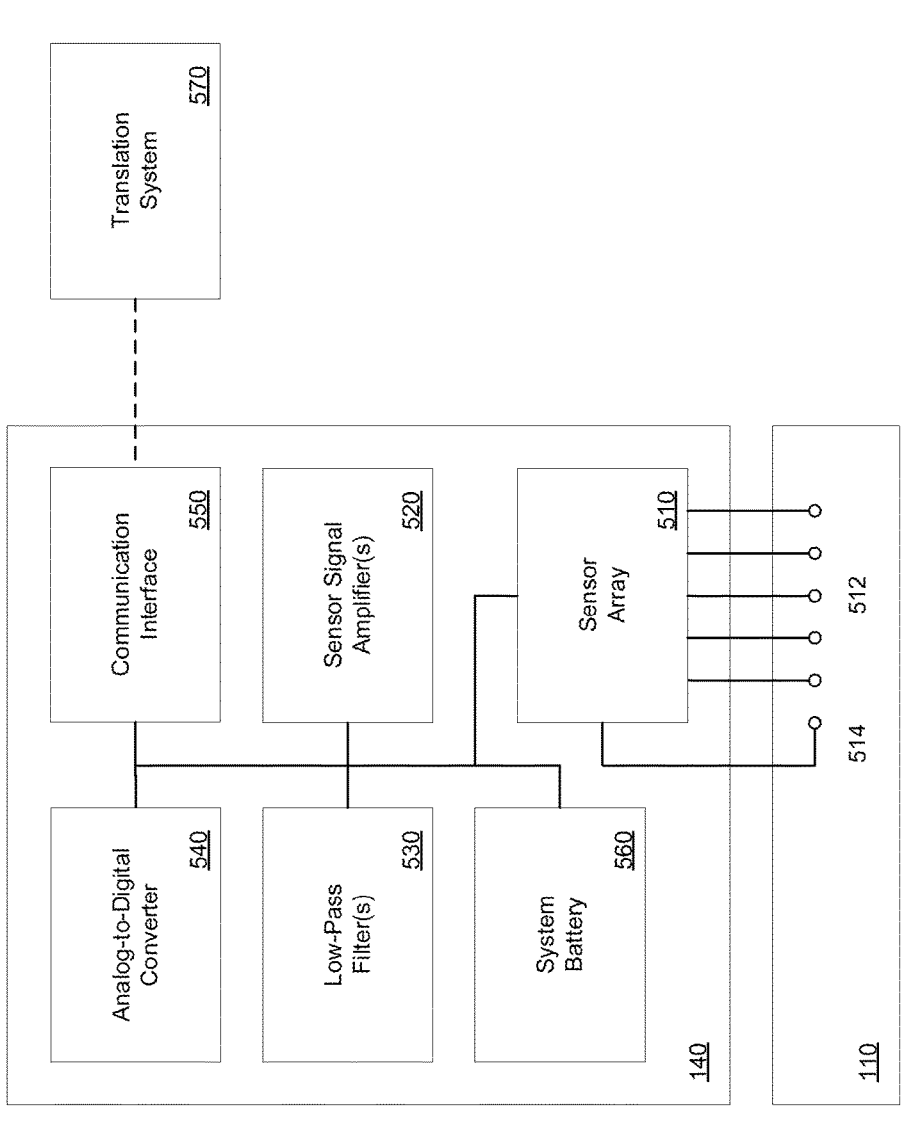
FIG. 5 illustrates an example electronic system of a wearable device for verbalizing nonverbal communication, in accordance with present implementations.

FIG. 5 illustrates an example electronic system of a wearable device for verbalizing nonverbal communication, in accordance with present implementations. As illustrated by way of example in FIG. 5, an example electronic system 500 includes a sensor array 510, a sensor signal amplifier 520, a low-pass filter 530, an analog-to-digital converter 540, a communication interface 550, and a system battery 560 associated with a body position acquisition system 140. The sensor array 510 is operatively coupled to one or more sensor fibers 512 affixed to a deformable structure 110, and optionally connected to an optionally electrical ground 514 also affixed to the deformable structure 110. In some implementations, the example electronic system 500 is operably coupleable with a translation system 570 by the communication interface 550.

The deformable structure 110 can correspond to one or more of a body part including but not limited to a hand, finger, digit, mouth, check, face, forehead, brow, temple, neck, arm, leg, foot, or the like, and any object wearable or the like thereon.

The sensor array 510 is operable to obtain triboelectric response from one or more sensors 512 operably coupled to the deformable structure 110. It is to be understood that the sensor 512 can correspond to individual sensor fibers 200 each affixed directly or indirectly to a finger, other body part, or the like. The electrical ground 514 is operably coupled to a reference voltage at the deformable structure and at the sensor array 510. It is to be understood that the electrical ground can be operably coupled to any suitable grounding surface or object, and is not limited to the illustrated ground connection.

The sensor signal amplifier 520 is operable to increase magnitude of the tribioelectric voltage or other electrical response received from one or more of the sensor fibers. In some implementations, the sensor signal amplifier 520 includes one or more logical or electronic devices including but not limited to integrated circuits, logic gates, flip flops, gate arrays, programmable gate arrays, and the like. It is to be understood that any electrical, electronic, or like devices, or components associated with the sensor signal amplifier 520 can also be associated with, integrated with, integrable with, replaced by, supplemented by, complemented by, or the like, a system processor or any component thereof. It is to be further understood that the sensor signal amplifier 520 can comprise a plurality of devices each individually operatively coupled to a corresponding one of the sensor fibers 200.

The low-pass filter 530 is operable to reduce or remove analog signal interference, environmental noise, or the like, from an amplified electrical response received from the sensor signal amplifier 520. The signal conditioning path for each sensor can be implemented in relation to corresponding transduced signals with an analog circuit In some implementations, the low-pass filter 530 includes one or more logical or electronic devices including but not limited to integrated circuits, logic gates, flip flops, gate arrays, programmable gate arrays, and the like. It is to be understood that any electrical, electronic, or like devices, or components associated with the low-pass filter 530 can also be associated with, integrated with, integrable with, replaced by, supplemented by, complemented by, or the like, a system processor or any component thereof.

The analog-to-digital converter 540 is operable to convert an analog triboelectric response voltage or the like to a digital body position response. In some implementations, the analog-to-digital converter 540 is 12 bits, and sends 500×5×2/20 times per second. In some implementations, sampling rate of each channel in the analog-to-digital converter 540 is 500 Hz, and the analog-to-digital converter 540 sends 20 bytes per packet and in 2 ms bursts. In some implementations, the analog-to-digital converter 540 includes one or more logical or electronic devices including but not limited to integrated circuits, logic gates, flip flops, gate arrays, programmable gate arrays, and the like. It is to be understood that any electrical, electronic, or like devices, or components associated with the analog-to-digital converter 540 can also be associated with, integrated with, integrable with, replaced by, supplemented by, complemented by, or the like, a system processor or any component thereof.

The communication interface 550 is operable to communicatively couple the body position acquisition system 140 to the translation system 570 or any external device. In some implementations, an external device includes but is not limited to a smartphone, mobile device, wearable mobile device, tablet computer, desktop computer, laptop computer, cloud server, local server, and the like. In some implementations, the communication interface 550 is operable to communicate one or more instructions, signals, conditions, states, or the like between one or more of the body position acquisition system 140 and the external device. In some implementations, the communication interface 550 includes one or more digital, analog, or like communication channels, lines, traces, or the like. As one example, the communication interface 550 is or includes at least one serial or parallel communication line among multiple communication lines of a communication interface. In some implementations, the communication interface 550 is or includes one or more wireless communication devices, systems, protocols, interfaces, or the like. In some implementations, the communication interface 550 includes one or more logical or electronic devices including but not limited to integrated circuits, logic gates, flip flops, gate arrays, programmable gate arrays, and the like. In some implementations, the communication interface 550 includes ones or more telecommunication devices including but not limited to antennas, transceivers, packetizers, wired interface ports, and the like. It is to be understood that any electrical, electronic, or like devices, or components associated with the communication interface 550 can also be associated with, integrated with, integrable with, replaced by, supplemented by, complemented by, or the like, the body position acquisition system 140 or any component thereof.

The system battery 560 includes one or more electrical, electronic, electromechanical, electrochemical, or like devices or systems for at least one of receiving, storing and distributing input power. In some implementations, the system battery 560 includes one or more stacks of batteries. In some implementations, the system battery 560 includes lithium-ion or like energy storage. In some implementations, the system battery 560 is integrated with, integrable with, or separable from the system 100. In some implementations, the system battery 560 includes a plurality of battery units variously or entirely integrated with, integrable with, or separable from the system 100. The sensor array 510 and the sensors 512 are self-powered with zero power consumption. Thus, in some implementations, an example system operates with real-time data processing and Bluetooth communication for approximately 23.6 hours without recharge.

The translation system 570 is operable to receive one or more digital body position responses and generate a verbalized response. In some implementations, the translation system 570 includes a customized mobile application, which can be embedded with a machine learning algorithm for robust translation of sign language hand gesture to speech. The mobile app can include a built-in machine learning algorithm, which combines feature extraction and a multiclass support vector machine (SVM) classifier. Features can be extracted from the transmitted data and serve as inputs for the trained multi-class SVM classifier, which improves expression accuracy and robustness of the wearable sign-to-speech translation system. In some implementations, a computer device can subsequently analyze the received signals and display the appropriate number on the screen. As one example, numbers, such as "1", "2", and "4," can then be wirelessly transmitted and displayed on the computer screen via the corresponding hand gestures.

Figure 6:
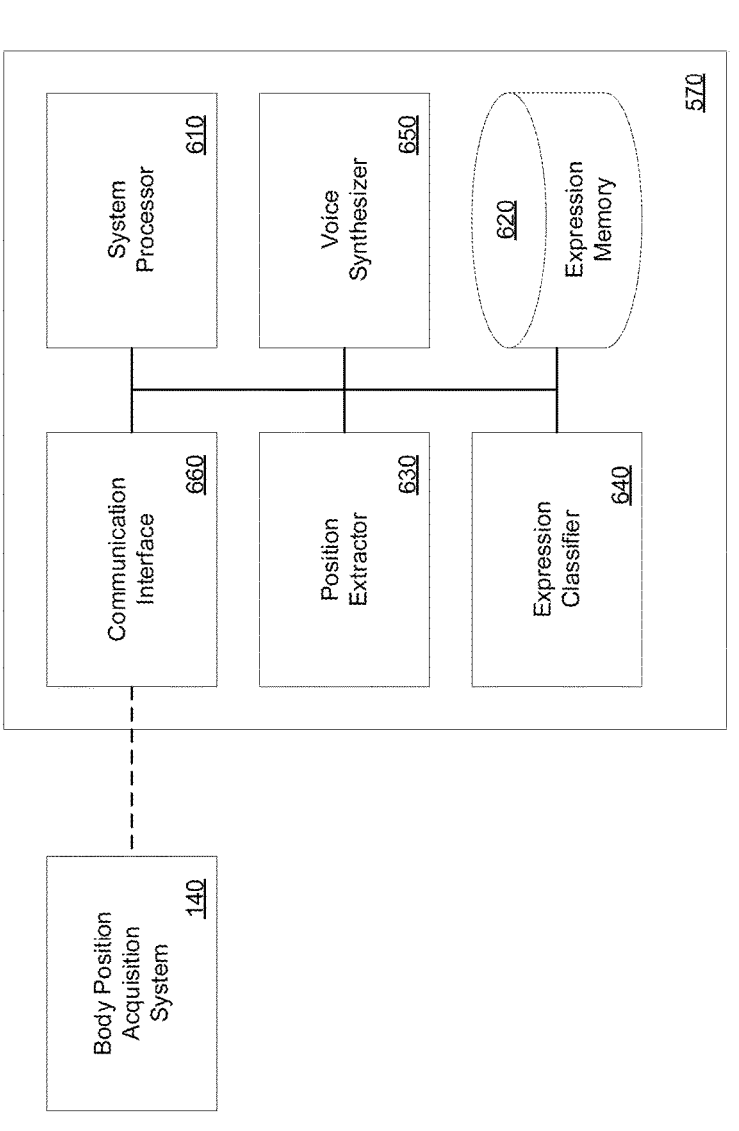
FIG. 6 illustrates an example electronic system of a wearable device for verbalizing nonverbal communication further to the example electronic system of FIG. 5.

FIG. 6 illustrates an example electronic system of a wearable device for verbalizing nonverbal communication further to the example electronic system of FIG. 5. As illustrated by way of example in FIG. 6, an example electronic system 600 includes a system processor 610, an expression memory 620, a position extractor 630, an expression classifier 640, a voice synthesizer 650, and a communication interface 660. In some implementations, the example electronic system 600 is operably coupleable with the body position acquisition system 140 by the communication interface 660.

The system processor 610 is operable to execute one or more instructions associated with input from one or more of the expression memory 620, the position extractor 630, the expression classifier 640, the voice synthesizer 650, and the communication interface 660. In some implementations, the system processor 610 is an electronic processor, an integrated circuit, or the like including one or more of digital logic, analog logic, digital sensors, analog sensors, communication buses, volatile memory, nonvolatile memory, and the like. In some implementations, the system processor 610 includes but is not limited to, at least one microcontroller unit (MCU), microprocessor unit (MPU), central processing unit (CPU), graphics processing unit (GPU), physics processing unit (PPU), embedded controller (EC), or the like. In some implementations, the system processor 610 includes a memory operable to store or storing one or more instructions for operating components of the system processor 610 and operating components operably coupled to the system processor 610. In some implementations, the one or more instructions include at least one of firmware, software, hardware, operating systems, embedded operating systems, and the like. It is to be understood that the system processor 610 can include at least one communication bus controller to effect communication between the system processor 610 and the other elements of the body position acquisition system 140.

The expression memory 620 is operable to store one or more body position inputs, machine learning models, and the like. In some implementations, the expression memory 620 is or includes a database or the like. In some implementations, the expression memory 620 includes ones or more hardware memory devices for storing binary data, digital data, or the like. In some implementations, the expression memory 620 includes one or more electrical components, electronic components, programmable electronic components, reprogrammable electronic components, integrated circuits, semiconductor devices, flip flops, arithmetic units, or the like. In some implementations, the expression memory 620 includes at least one of a non-volatile memory device, a solid-state memory device, a flash memory device, and a NAND memory device. In some implementations, the expression memory 620 includes one or more addressable memory regions disposed on one or more physical memory arrays. In some implementations, a physical memory array includes a NAND gate array disposed on a particular semiconductor device, integrated circuit device, printed circuit board device, and the like.

The position extractor 630 is operable to generate a simplified body position input for machine learning processing by extracting critical features from digital body position input. In some implementations, the position extractor operates a principal component analysis (PCA). The position extractor 630 can thus simplify body position input data for faster and more efficient machine learning training and real-time verbalization processing. Thus, in accordance with an example PCA, each gesture analog signal $x_1$ can be merged into a set X.

$$X=\{x_1,x_2,x_3,\ldots x_n\} \tag{1}$$

The second step is to calculate the mean signal $X_{mean}$.

$$X_{mean}=\frac{1}{i}\sum\nolimits_{n=1}^{i}x_n \tag{2}$$

Then, find the difference $\varphi$ between the input signal and the mean signal.

$$\varphi=N_i-X_{mean} \tag{3}$$

The covariance matrix U can be calculated as follows $$U=\frac{1}{i}\sum\nolimits_{n=1}^{i}\varphi_n\varphi_n^T \tag{4}$$

The eigenvalues ($\lambda_1$, $\lambda_2$, $\lambda_3$, $\ldots\lambda_k$) and eigenvectors ($\omega_1$, $\omega_2$, $\omega_3$, $\ldots\omega_k$) can be obtained from the covariance matrix, where k is the rank of U.

$$U\omega_i=\lambda_i\omega_i\ (i=1,2,3,\ldots k) \tag{5}$$

Finally, all of the original signals can be projected into a principal component matrix W$\{\omega_1, \omega_2, \omega_3, \ldots \omega_k\}$.

$$y=W^T(x-X_{mean}) \tag{6}$$

By adjusting the k value, the rank of W can be changed, and thus the dimension of the output can be controlled. The example principal component of the set X after dimensionality reduction can be obtained by equation (6). In some implementations, the position extractor 630 includes one or more logical or electronic devices including but not limited to integrated circuits, logic gates, flip flops, gate arrays, programmable gate arrays, and the like. It is to be understood that any electrical, electronic, or like devices, or components associated with the position extractor 630 can also be associated with, integrated with, integrable with, replaced by, supplemented by, complemented by, or the like, the system processor 610 or any component thereof.

The expression classifier 640 is operable to identify a nonverbal expression based on one or more body position inputs corresponding to that nonverbal expression. In some implementations, the nonverbal expression is an aggregate of body position inputs associated with one or more fingers, one or more facial positions, one or more body positions, or a combination of any subset thereof. In some implementations, the expression classifier 640 is operable in accordance with a support vector machine (SVM). The expression classifier 640 can include a multi-class SVM, including but not limited to one-versus-all SVM, to classify one or more body position inputs. In an example one-versus-all SVM, classification functions are constructed between one class and all other classes. As one example, eleven classes of gestures can be acquired for classification, and eleven classification functions can be constructed. The $i^{th}$ SVM (i=1, 2, 3, . . . , 11) separates signals of the $i^{th}$ class associated by training or external input, for example, with positive labels, from all other classes, associated by exclusion, for example, with negative labels. During classification, the class with the largest classification-function output can be selected as a prediction class.

Example classification steps include the following. First, expression classifier 640 selects all training signals of a first gesture in the expression memory 620. Second, the expression classifier 640 labels the signals of the first gesture as positive samples and labels all the training signals of other gestures as negative samples. Third, the expression classifier 640 uses all positive and negative signals as an input to train the SVM. As a result, the corresponding example SVM and corresponding example classification planes are obtained. Fourth, the expression classifier 640 labels the SVM as SVM1, demonstrating that SVM1 is used for differentiating the first gesture from the remaining gestures. Fifth, the expression classifier 640 can optionally repeat the above steps for all gestures in the expression memory 620. In this example, eleven SVMs are obtained as SVM1, SVM2, . . . , SVM11. In some implementations, the expression classifier 640 includes one or more logical or electronic devices including but not limited to integrated circuits, logic gates, flip flops, gate arrays, programmable gate arrays, and the like. It is to be understood that any electrical, electronic, or like devices, or components associated with the expression classifier 640 can also be associated with, integrated with, integrable with, replaced by, supplemented by, complemented by, or the like, the system processor 610 or any component thereof.

The voice synthesizer 650 is operable to generate a verbal communication corresponding to a nonverbal expression. In some implementations, the voice synthesizer 650 includes one or more logical or electronic devices including but not limited to integrated circuits, logic gates, flip flops, gate arrays, programmable gate arrays, and the like. It is to be understood that any electrical, electronic, or like devices, or components associated with the voice synthesizer 650 can also be associated with, integrated with, integrable with, replaced by, supplemented by, complemented by, or the like, the system processor 610 or any component thereof. In some implementations, the voice synthesizer 650 is or includes an interface to operably couple the translation system to a remote or external text-to-speech system in accordance with present implementations.

The communication interface 660 is operable to communicatively couple the system processor 610 to the body position acquisition system 140 or any external device. In some implementations, at least one of the structure and operation of the communication interface 660 correspond to the corresponding structure or operation of the communication interface 550.

Figure 7:
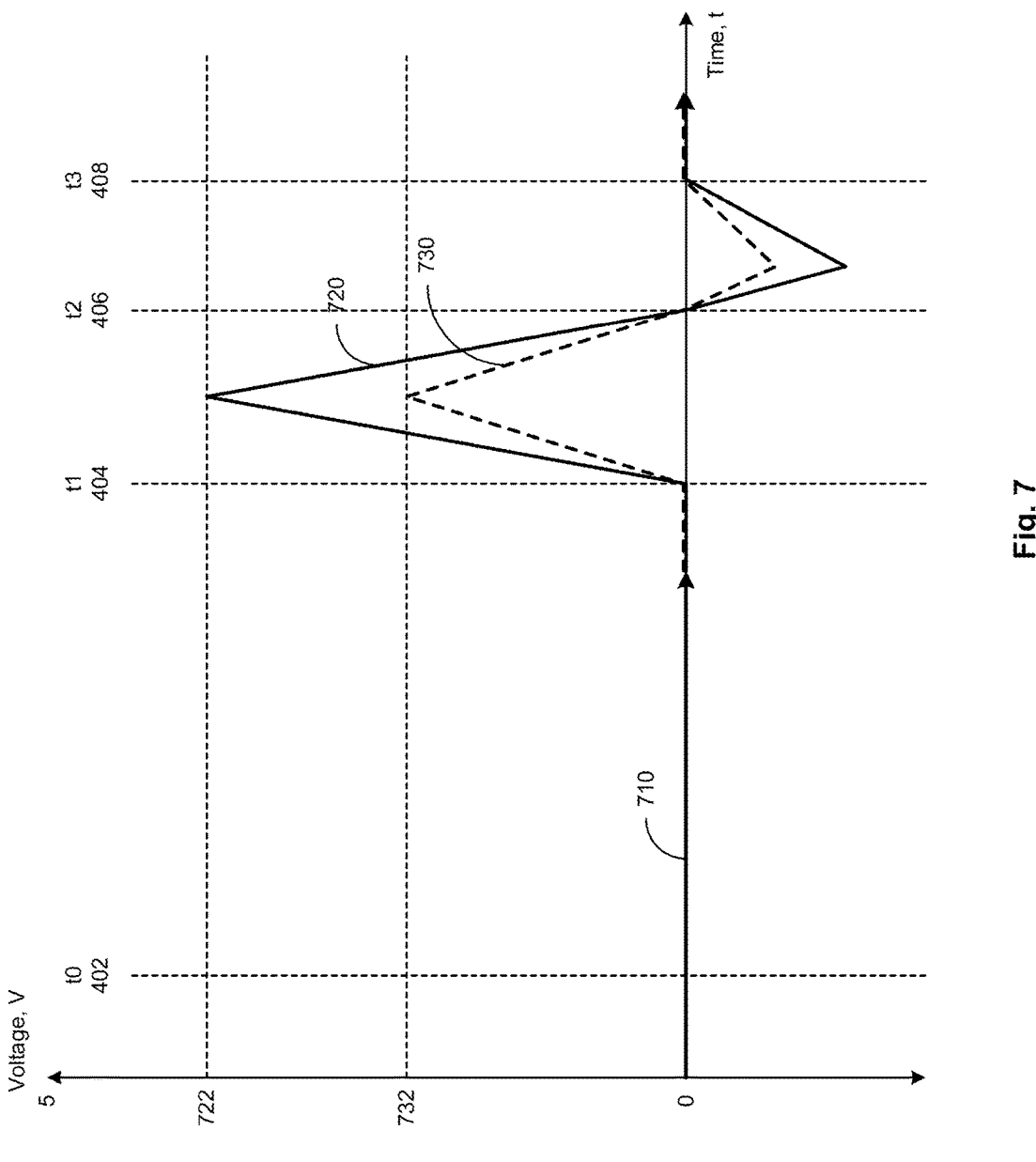
FIG. 7 illustrates an example electrical response of an example sensor fiber of a wearable device for verbalizing nonverbal communication, in accordance with present implementations.

FIG. 7 illustrates an example electrical response of an example sensor fiber of a wearable device for verbalizing nonverbal communication, in accordance with present implementations. As illustrated by way of example in FIG. 7, an example electrical response of an example sensor fiber 700 includes a static state response 710, a first deformation response 720, and a second deformation response 730. FIG. 7 illustrates an example static period between time t0 492 and time t1 404 in which no movement occurs, and a movement period between time t1 404 and time t3 408 in which one or more sensor fibers are deformed in response to one or more corresponding finger or body movements.

When multiple fingers move simultaneously, the motion information of each finger can be recorded and combined as a complex electrical signal, corresponding to a unique hand gesture. The data acquisition channels of five fingers are independent of each other. Combining the channels together allows for the monitoring of the motion of a hand. The translation system 570 can accurately recognize at least numbers "1," "2," and "4," corresponding to different sign language hand gestures without any inter-channel interference. In some implementations, a recognition time is between 0.4 to 1.0 seconds for various types of hand gestures corresponding to nonverbal expressions in sign language, including but not limited to ASL.

Between time t0 402 and t1 404, the body position acquisition system 140 receives at least one static state response 710 having a voltage substantially equal to zero and corresponds to no movement by any fingers or body parts. It is to be understood that that the static state response 710 can correspond to multiple sensor fibers 200 not subject to deformation and associated with multiple finger inputs at sensors 512. Between time t1 404 and t2 406, the body position acquisition system 140 receives at least one full shortening response 720 and one partial shortening response 730, each having a voltage greater than zero and corresponding to varying movement by various individual fingers or body parts toward a flexed position or the like. It is to be understood that responses 720 and 730 can correspond to individual fingers or other body parts moved concurrently. Between time t2 406 and t3 408, the body position acquisition system 140 receives at least one full lengthening response 720 and one partial lengthening response 730, each having a voltage less than zero and corresponding to varying movement by various individual fingers or body parts toward a relaxed position or the like.

FIG. 8A illustrates a first example method of manufacturing a wearable device for verbalizing nonverbal communication, in accordance with present implementations. In some implementations, at least one of the devices illustrated in FIGS. 1A, 1B, 2 and 3 are manufactured at least partially by an example system in accordance with according to present implementations. In some implementations, the method 800A begins at step 810.

At step 810, the example system twists at least one textile fiber around at least one conductive core. By twisting several polyester microfibers and a stainless-steel microfiber together, the conductive yarn with a diameter of ~400 μm can be fabricated. In some implementations, step 810 includes at least one of steps 812 and 814. At step 812, the example system twists yarn fiber around a conductive core. At step 814, the example system twists textile fiber around a stainless steel microfiber with a 10 micrometer (um) diameter. The method 800A then continues to step 820. At step 820, the example system twists at least one conductive fiber around a nonconductive core. In some implementations, step 820 includes step 822. At step 822, the example system twists a conductive fiber around a rubber core with a 1 millimeter (mm) diameter. The method 800A then continues to step 830.

At step 830, the example system fabricates a nonconductive sleeve. In some implementations, step 830 includes at least one of steps 832, 834 and 836. At step 832, the example system mixes a curing agent with a base monomer. At step 834, the example system degasifies the mixture in a vacuum. After degasification in a vacuum for 10 min to remove the gas bubbles at room temperature, At step 836, the example system spin coats the mixture onto a glass wafer. the PDMS mixture can be spin coated onto a smooth glass wafer and completely cured at 80° C. for 2 h. The method 800A then continues to step 840. At step 840, the example system disposes the sensor fiber within a nonconductive sleeve. In some implementations, the method 800A ends at step 840.

Figure 8B:
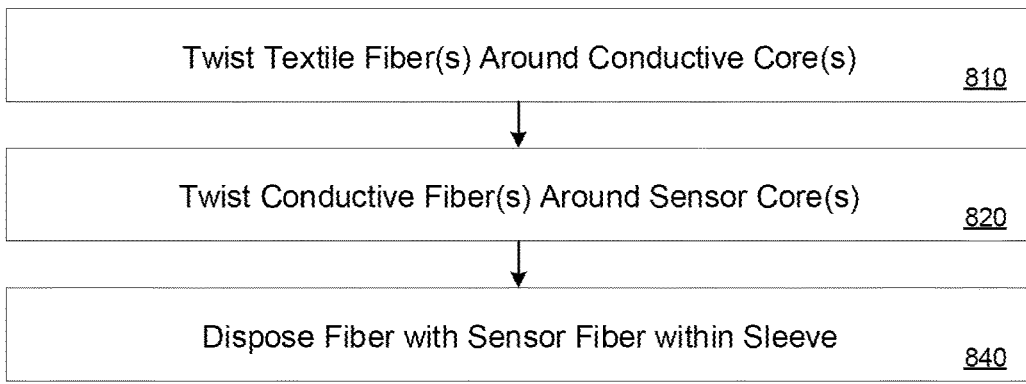
FIG. 8B illustrates a second example method of manufacturing a wearable device for verbalizing nonverbal communication, in accordance with present implementations.

FIG. 8B illustrates a second example method of manufacturing a wearable device for verbalizing nonverbal communication, in accordance with present implementations. In some implementations, at least one of the example devices and systems of FIGS. 1A, 1B, and 2-6 performs method 800B according to present implementations. In some implementations, the method 800B begins at step 810. At step 810, the example system twists at least one textile fiber around at least one conductive core. The method 800B then continues to step 820. At step 820, the example system twists at least one conductive fiber around a nonconductive core. The method 800B then continues to step 840. At step 840, the example system disposes the sensor fiber within a nonconductive sleeve. In some implementations, the method 800B ends at step 840.

FIG. 9 illustrates an example method of training a machine learning system associated with a wearable device for verbalizing nonverbal communication, in accordance with present implementations. In some implementations, at least one of the example devices and systems of FIGS. 1A, 1B, and 2-6 performs method 900 according to present implementations. In some implementations, sign-to-speech translation is generated by voltage signals from finger motions that can be classified by a machine learning system. In some implementations, the method 900 begins at step 910.

At step 910, the example system obtains one or more training body position inputs. In some implementations, step 910 includes at least one of steps 912 and 914. At step 912, the example system obtains one or more hand gestures corresponding to sign language expressions. At step 914, the example system obtains one or more facial positions corresponding to facial expressions. The method 900 then continues to step 920.

At step 920, the example system transforms one or more training body position inputs by a principal component analysis (PCA). In some implementations, during the training process, the electrical signals generated by each sign language hand gesture can be merged into a matrix as the input of principal component analysis (PCA) for feature extraction. Applying PCA can extract principal features of each gesture and remove redundant information. The method 900 then continues to step 930. At step 930, the example system obtains a target body position. The method 900 then continues to step 940.

At step 940, the example system generates one or more training inputs for a support vector machine (SVM). In some implementations, step 940 includes at least one of steps 942 and 944. At step 942, the example system applies a first class to body position inputs corresponding to the target body position. At step 944, the example system applies a second class to body position inputs excluding or not corresponding to the target body position. The method 900 then continues to step 950.

At step 950, the example system generates one or more SVM classification outputs associated with the target body position. In some implementations, step 950 includes at least one of steps 952 and 954. At step 952, the example system trains the SVM based on the classified inputs associated with the first class and the second class. a multi-class support vector machine (SVM) algorithm is applied to classify hand gesture patterns by using the extracted features with PCA. In the algorithm, each class of the acquired hand gesture recognition pattern can be set as a classifier sample, and the remaining samples can be used to obtain a binary class SVM classifier and then create a multi-class classifier. At step 954, the example system generates one or more classification planes based on the classified inputs. The method 900 then continues to step 960.

At step 960, the example system determines whether another body position is available for classification. In accordance with a determination that another body position is available for classification, the method 900 continues to step 930. Alternatively, in accordance with a determination that another body position is available for classification, the method 900 continues to step 1002.

Figure 10:
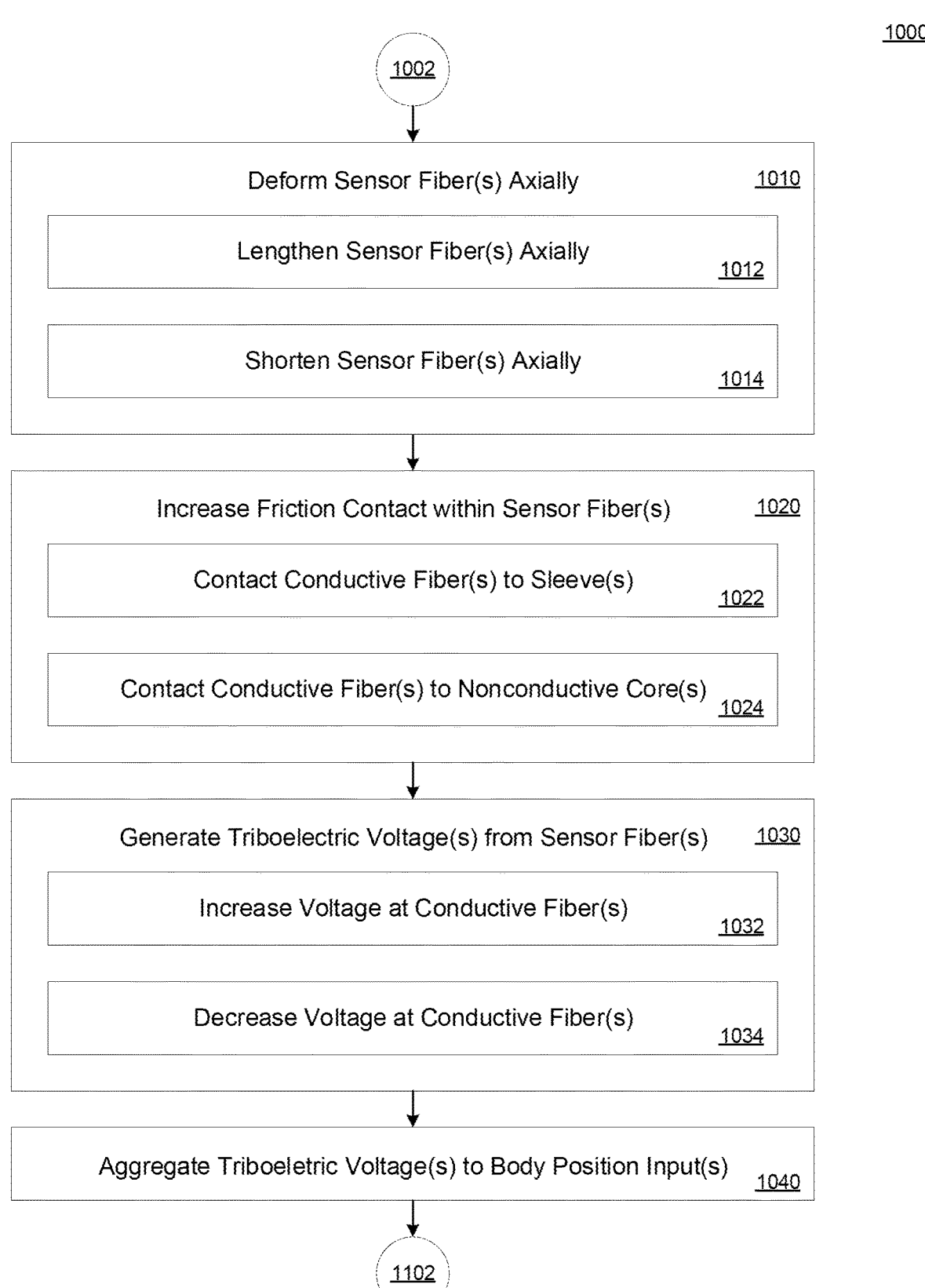
FIG. 10 illustrates an example method of detecting non-verbal communication by a wearable device for verbalizing nonverbal communication further to the example method of FIG. 9.

FIG. 10 illustrates an example method of detecting nonverbal communication by a wearable device for verbalizing nonverbal communication further to the example method of FIG. 9. In some implementations, at least one of the example devices and systems of FIGS. 1A, 1B, and 2-6 performs method 1000 according to present implementations. In some implementations, the method 1000 begins at step 1002. The method 1000 then continues to step 1010.

At step 1010, the example system deforms at least one sensor fiber axially. In some implementations, step 1010 includes at least one of steps 1012 and 1014. At step 1012, the example system lengthens the sensor fiber axially. At step 1014, the example system shortens the sensor fiber axially. The method 1000 then continues to step 1020. At step 1020, the example system increase friction contact within a sensor fiber. In some implementations, step 1020 includes at least one of steps 1022 and 1024. At step 1022, the example system contacts at least one conductive fiber of the sensor fiber to a nonconductive sleeve of the sensor fiber. At step 1024, the example system contacts at least one conductive fiber of the sensor fiber to a nonconductive conre of the sensor fiber. The method 1000 then continues to step 1030. At step 1030, the example system generates at least one triboelectric voltage from at least one sensor fiber. In some implementations, step 1030 includes at least one of steps 1032 and 1034. At step 1032, the example system increases voltage at one or more conductive fibers. At step 1034, the example system decreases voltage at one or more conductive fibers. The method 1000 then continues to step 1040.

At step 1040, the example system aggregates one or more triboelectric voltages into one or more corresponding body position inputs. It is to be understood that the example system can optionally aggregate the triboelectric voltages corresponding to one or more fingers, facial positions, body positions, or the like. The method 1000 then continues to step 1102.

FIG. 11 illustrates an example method of verbalizing nonverbal communication further to the example method of FIG. 10. In some implementations, at least one of the example devices and systems of FIGS. 1A, 1B, and 2-6 performs method 1100 according to present implementations. As one example, the example system can perform real-time sign-to-speech translation for at least eleven sign language hand gestures ("A", "B", "C", "I", "L", "Y", "1", "2", "3", "8", "I love you") from American Sign Language, representing the fundamental elements of communication— numbers, words and phrases. In some implementations, the method 1100 begins at step 1102. The method 1100 then continues to step 1110.

At step 1110, the example system obtains one or more inputs corresponding to one or more body positions. In some implementations, step 1110 includes at least one of steps 1112 and 1114. At step 1112, the example system obtains one or more hand gestures corresponding to one or more sign language expressions. At step 1114, the example system obtains one or more facial positions corresponding to one or more facial expressions. The example system can detect changes from facial expressions by acquired electric signals from example movements including but not limited to frowning and mouth opening. The method 1100 then continues to step 1120.

At step 1120, the example system transforms obtained inputs by PCA. In some implementations, the example system transforms in accordance with the position extractor 630. The method 1100 then continues to step 1130.

At step 1130, the example system classifies one or more transformed inputs to a corresponding expression by SVM model. In some implementations, the example system classifies in accordance with the expression classifier 630. The example system can, for at least 8 out of the 11 gestures noted above, achieve a classification accuracy exceeding 99.99%, while the and a minimum accuracy of 95%. The overall accuracy can be 98.63%. Average recognition time for at least these gestures in this gesture class is less than one second. In some implementations, step 1130 includes at least one of steps 1132 and 1134. At step 1132, the example system classifies the inputs by one or more SVM classification planes. At step 1134, the example system classifies the inputs by a multi-class classification. The method 1100 then continues to step 1140.

At step 1140, the example system generates at least one verbal communication corresponding to the classified expression. In some implementations, step 1140 includes at least one of steps 1142 and 1144. At step 1142, the example system generates at least one verbal communication corresponding to a sign language hand gesture. In some implementations, the example system generates the verbal communication by a customized mobile application with the capability to convert text into speech by matching the text with a local or remote interface for text-to-speech. In some implementations, at least one hand gesture and the real-time electrical signals of each fingers can be also displayed on a main interface of the mobile device. As one example, the sign for "I" "L" "Y" and "I love you" can be successively and successfully translated into speech and played via the mobile phone. At step 1144, the example system generates at least one verbal communication corresponding to a facial position. In some implementations, the method 1100 ends at step 1140.

Figure 12:
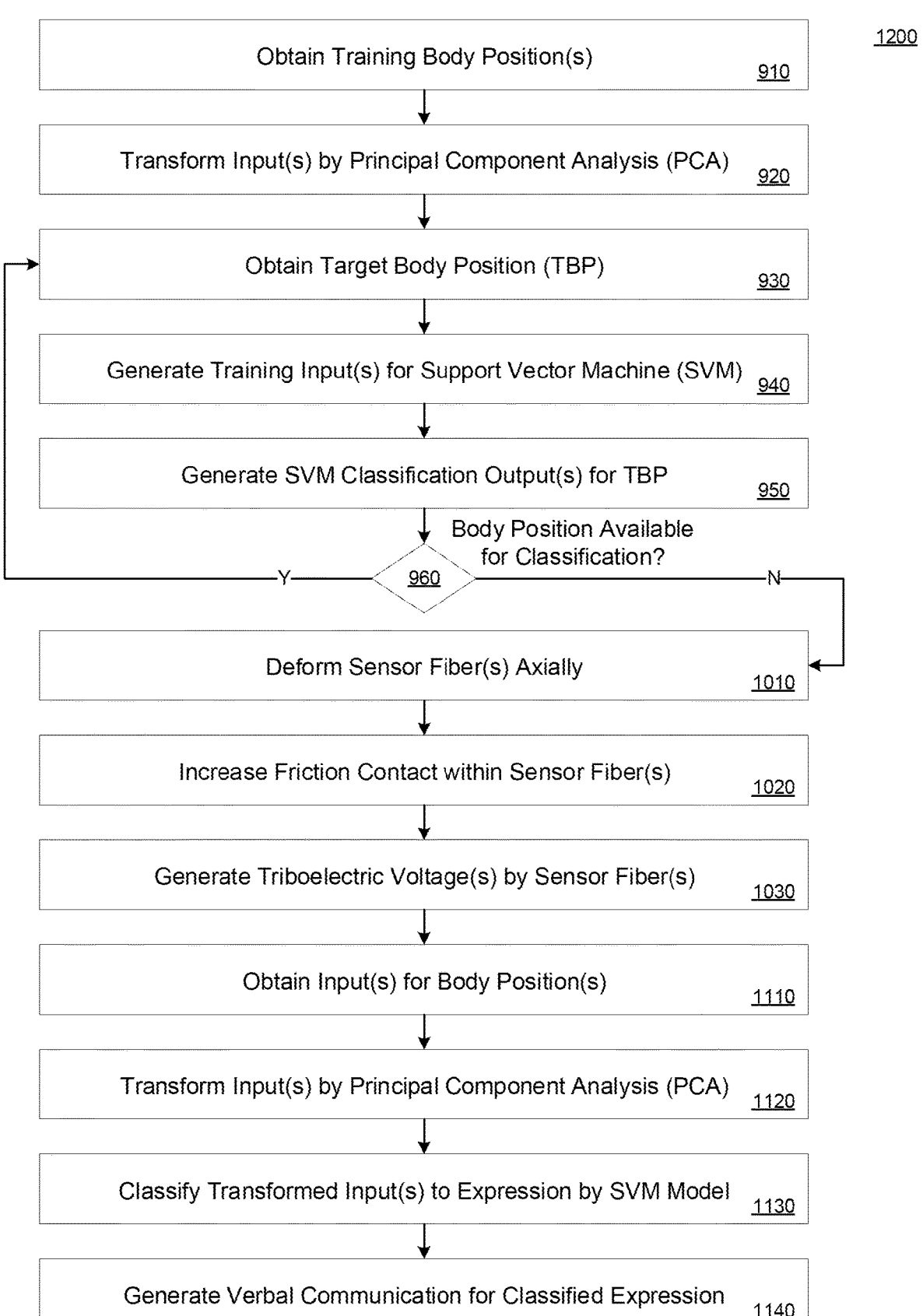
FIG. 12 illustrates an example method of detecting and verbalizing nonverbal communication, in accordance with present implementations.

FIG. 12 illustrates an example method of detecting and verbalizing nonverbal communication, in accordance with present implementations. In some implementations, at least one of the example devices and systems of FIGS. 1A, 1B, and 2-6 performs method 1100 according to present implementations. In some implementations, the method 1200 begins at step 910.

At step 910, the example system obtains one or more training body position inputs. The method 1200 then continues to step 920. At step 920, the example system transforms one or more training body position inputs by a principal component analysis (PCA). The method 1200 then continues to step 930. At step 930, the example system obtains a target body position. The method 1200 then continues to step 940. At step 940, the example system generates one or more training inputs for a support vector machine (SVM). The method 1200 then continues to step 950. At step 950, the example system generates one or more SVM classification outputs associated with the target body position. The method 1200 then continues to step 960. At step 960, the example system determines whether another body position is available for classification. In accordance with a determination that another body position is available for classification, the method 1200 continues to step 930. Alternatively, in accordance with a determination that another body position is not available for classification, the method 1200 continues to step 1010.

At step 1010, the example system deforms at least one sensor fiber axially. The method 1200 then continues to step 1020. At step 1020, the example system increase friction contact within a sensor fiber. The method 1200 then continues to step 1030. At step 1030, the example system generates at least one triboelectric voltage from at least one sensor fiber. The method 1200 then continues to step 1110.

At step 1110, the example system obtains one or more inputs corresponding to one or more body positions. The method 1200 then continues to step 1120. At step 1120, the example system transforms obtained inputs by PCA. The method 1200 then continues to step 1130. At step 1130, the example system classifies one or more transformed inputs to a corresponding expression by SVM model. The method 1200 then continues to step 1140. At step 1140, the example system generates at least one verbal communication corresponding to the classified expression. In some implementations, the method 1200 ends at step 1140.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A triboelectric sensor device comprising:
   a substantially cylindrical nonconductive core; and
   a conductive fiber substantially helically disposed around the nonconductive core and in an axial direction thereof, wherein the conductive fiber comprises:
   a substantially cylindrical conductive core; and
   a nonconductive fiber substantially helically disposed around the conductive core in an axial direction thereof.

2. The device of claim 1, wherein the conductive fiber is deformable in response to a deformation of a biological surface.

3. The device of claim 1, wherein the conductive fiber is disposed on a moveable biological surface.

4. The device of claim 1, wherein the conductive fiber comprises an electrical sensor array.

5. The device of claim 1, further comprising:
   an electrical sensor array comprising a plurality of conductive fibers,
   wherein the conductive fiber comprises the plurality of conductive fibers.

6. The device of claim 5, further comprising:
   a sensor signal amplifier operatively coupled to the electrical sensor array;
   a low-pass filter operatively coupled to the sensor signal amplifier;
   an analog-to-digital converter operatively coupled to the low-pass filter; and
   a communication interface operatively coupled to the analog-to-digital converter, wherein the communication interface is operably coupled to a translation system.

7. The device of claim 1, wherein the nonconductive fiber comprises a plurality of nonconductive fibers substantially helically disposed around the conductive core in an axial direction thereof, and the conductive fiber further comprises the plurality of nonconductive fibers.

8. The device of claim 1, wherein the nonconductive fiber comprises a textile fiber.

9. The device of claim 1, wherein the nonconductive fiber has a diameter of substantially 10 micrometers.

10. The device of claim 1, further comprising:
    a nonconductive sleeve disposed around the conductive core and the conductive fiber in an axial direction of the conductive core.

11. The device of claim 1, wherein the nonconductive core comprises rubber.

12. The device of claim 1, wherein the nonconductive core has a diameter of substantially 1 millimeter.

13. The device of claim 1, wherein the nonconductive sleeve comprises polydimethylsiloxane.

14. A method of manufacturing a deformable sensor array for body position detection, the method comprising:
    twisting a textile fiber around a substantially cylindrical conductive core to form a conductive fiber;
    twisting the conductive fiber around a substantially cylindrical nonconductive core to form a sensor fiber;
    disposing the sensor fiber within a nonconductive sleeve;

mixing a curing agent with a base monomer to form a nonconductive sleeve material; and fabricating the nonconductive sleeve from the nonconductive sleeve material, wherein the fabricating the nonconductive sleeve comprises degasifying the nonconductive sleeve material in a vacuum.

15. The method of claim 14, wherein the fabricating the nonconductive sleeve further comprises:

spin coating the nonconductive sleeve material onto a glass wafer.

16. The method of claim 14, wherein the textile fiber comprises a textile yarn.

17. The method of claim 14, wherein the conductive core has a diameter of substantially 10 micrometers.

18. The method of claim 14, wherein the conductive core comprises steel microfiber.

19. The method of claim 14, wherein the conductive core has a diameter of substantially 10 micrometers.

20. The method of claim 14, wherein the nonconductive core comprises rubber.

21. The method of claim 14, wherein the nonconductive core has a diameter of substantially 1 millimeter.

22. The method of claim 14, wherein the nonconductive sleeve comprises polydimethylsiloxane.

23. A method of extracting communication from body position, the method comprising:

transforming one or more training body position inputs by a principal component analysis, wherein the training body position inputs comprise at least hand gestures associated with sign language expressions;

generating training inputs to a support vector machine (SVM) based on a target body position; and generating one or more SVM classification outputs associated with the target body position.

24. The method of claim 23, further comprising:

obtaining the target body position from the transformed training body position inputs.

25. The method of claim 23, further comprising:

obtaining one or more predetermined body positions, wherein the training body position inputs comprise the predetermined body position inputs.

26. The method of claim 23, wherein the training body position inputs further comprise facial positions associated with facial expressions.

27. The method of claim 23, wherein the generating training inputs to a support vector machine (SVM) based on the target body position further comprises:

applying a first class to a first set of one or more training body position inputs each associated with the target body position.

28. The method of claim 23, wherein the generating training inputs to a support vector machine (SVM) based on the target body position further comprises:

applying a second class to a second set of one or more training body position inputs excluded from the first set of training body position inputs.

29. The method of claim 28, wherein the generating the SVM classification outputs associated with the target body position further comprises:

inputting the first and second classes to the SVM; and training the SVM based on the first and second classes.

30. The method of claim 29, wherein the generating the SVM classification outputs associated with the target body position further comprises:

generating one or more classification planes based on the training the SVM.

31. A method of detecting body position by a deformable sensor array, the method comprising:

deforming a sensor fiber in an axial direction thereof;

increasing friction contact within the sensor fiber;

generating a triboelectric voltage at a conductive fiber of the sensor fiber;

obtaining a body position input based on the triboelectric voltage;

transforming the body position input based on a principal component analysis;

classifying body position by a trained SVM to an expression; and generating a verbal communication based on the classified body position.

32. The method of claim 31, wherein the deforming the sensor fiber in the axial direction thereof comprises lengthening the sensor fiber axially.

33. The method of claim 32, wherein the generating the triboelectric voltage at the conductive fiber of the sensor fiber further comprises:

increasing triboelectric voltage at the conductive fiber in response to the lengthening the sensor fiber axially.

34. The method of claim 31, wherein the deforming the sensor fiber in the axial direction thereof comprises shortening the sensor fiber axially.

35. The method of claim 34, wherein the generating the triboelectric voltage at the conductive fiber of the sensor fiber further comprises:

decreasing triboelectric voltage at the conductive fiber in response to the shortening the sensor fiber axially.

36. The method of claim 31, further comprising:

affixing the sensor fiber to a body having a body position, wherein the deforming the sensor fiber in the axial direction thereof comprises deforming the sensor fiber in the axial direction thereof in response to a change in the body position.

37. The method of claim 31, wherein the increasing friction contact within the sensor fiber further comprises:

contacting the conductive fiber to a nonconductive sleeve of the sensor fiber; and contacting the conductive fiber to a nonconductive core of the sensor fiber.

38. The method of claim 31, further comprising:

aggregating a plurality of body positions respectively associated with a corresponding plurality of triboelectric voltages generated by a corresponding plurality of sensor fibers, wherein the body position comprises the plurality of body positions, the triboelectric voltage comprises the plurality of triboelectric voltages, and the sensor fiber comprises the plurality of sensor fibers.

39. The method of claim 38, wherein the body positions are respectively associated with a hand gesture, and the expression corresponds to a sign language expression corresponding to the hand gesture.

40. The method of claim 31, wherein the body position is respectively associated with a facial position, and the expression corresponds to a facial expression corresponding to the facial position.

41. The method of claim 31, wherein the verbal communication is a natural language verbal communication corresponding to a hand gesture corresponding to the classified body position.

42. The method of claim 31, wherein deforming the sensor fiber is performed for a plurality of the sensor fibers respectively associate with a plurality of fingers of a hand, and wherein increasing friction contact is performed for the plurality of the sensor fibers, and wherein generating the triboelectric voltage is performed for the plurality of the sensor fibers, and wherein obtaining the body position input includes obtaining body position inputs for the plurality of fingers of the hand, and wherein classifying body position includes identifying a sign language expression corresponding to a gesture produced by the plurality of fingers of the hand.

* * * * *